(12) United States Patent
Sietzen et al.

(10) Patent No.: US 12,361,619 B2
(45) Date of Patent: Jul. 15, 2025

(54) METHODS AND SYSTEMS FOR PROMPT-BASED IMAGE EDITING

(71) Applicant: Canva Pty Ltd, Surry Hills (AU)

(72) Inventors: Stefan Paul Sietzen, Salzburg (AT); Sanchit Sanchit, Vienna (AT); Alexander Tack, Vienna (AT)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/882,265

(22) Filed: Sep. 11, 2024

(65) Prior Publication Data

US 2025/0095254 A1 Mar. 20, 2025

(30) Foreign Application Priority Data

Sep. 14, 2023 (AU) ................. 2023229567

(51) Int. Cl.
*G06T 11/60* (2006.01)
*G06T 5/70* (2024.01)

(52) U.S. Cl.
CPC ............ *G06T 11/60* (2013.01); *G06T 5/70* (2024.01); *G06T 2210/22* (2013.01)

(58) Field of Classification Search
CPC ....... G06T 11/60; G06T 5/70; G06T 2210/22; G06T 11/001; G06T 5/77; G06T 5/00;
(Continued)

(56) References Cited

U.S. PATENT DOCUMENTS 11,762,622 B1\* 9/2023 Olsen ............... G06F 3/147
345/619
2014/0314289 A1 10/2014 Spottiswoode et al.
(Continued)

FOREIGN PATENT DOCUMENTS

CN 116029913 A 4/2023
CN 116385328 A 7/2023
(Continued)

OTHER PUBLICATIONS

U.S. Appl. No. 63/465,226, Drawings-only-black-and-white-line-drawings, May 9, 2023. (Year: 2023).\*
(Continued)

*Primary Examiner* — Jose L Couso
(74) *Attorney, Agent, or Firm* — GrowIP Law Group LLC

(57) ABSTRACT

Some embodiments relate to a method of performing prompt-based image editing. The method includes accessing an image; receiving a selected area of the image; receiving a prompt, wherein the prompt is indicative of an editing instruction; generating a latent by transforming the image into visual noise; predicting, based on the latent and the prompt, a noise image corresponding to the latent; subtracting at least a portion of the noise image from the latent to generate an updated latent; generating a noisy representation of the image; generating a masked latent based on the noisy representation, the updated latent and selected area, wherein the masked latent comprises the updated latent in the areas corresponding to the selected area, and the noisy representation in the areas that do not correspond to the selected area.

20 Claims, 12 Drawing Sheets
(6 of 12 Drawing Sheet(s) Filed in Color)

(58) Field of Classification Search
CPC .............. G06T 19/20; G06T 2200/24; G06T 2207/20092; G06T 2207/20104; G06T 3/4046; G06T 5/60; G06T 9/002; G06T 2207/20076; G06T 2207/20081; G06T 2207/20084; G06F 3/04845; G06F 18/256; G06F 3/017; G06F 3/04883; G06F 3/167; G06F 18/214; G06F 18/22; G06F 18/241; G06F 18/24; G06F 18/2411; G06F 18/2415; G06V 10/235; G06V 10/248; G06V 10/25; G06V 10/98; G06V 40/28; G06V 10/454; G06V 10/54; G06V 10/774; G06V 10/82; G06V 20/41; G06V 30/18057; G06V 20/698; G06V 30/19173; G06N 3/02; G06N 3/08–088; G06N 3/0445; G06N 3/0454; G06N 3/4046; G06N 7/00; G06N 7/01; G06N 20/00; G06K 7/1482; Y10S 128/925

See application file for complete search history.

(56) References Cited

U.S. PATENT DOCUMENTS

| | | | | |
|---|---|---|---|---|
| 2018/0365813 | A1* | 12/2018 | Leong | G06T 7/11 |
| 2020/0042286 | A1* | 2/2020 | Bui | G06F 3/04845 |
| 2022/0005161 | A1* | 1/2022 | Djelouah | G06N 3/045 |
| 2022/0122308 | A1* | 4/2022 | Kalarot | G06T 3/02 |
| 2022/0383570 | A1 | 12/2022 | Ling et al. | |
| 2024/0037822 | A1* | 2/2024 | Aberman | G06T 11/60 |
| 2024/0122308 | A1* | 4/2024 | McKeown | A44B 19/262 |
| 2024/0127511 | A1* | 4/2024 | Brdiczka | G06F 40/30 |
| 2024/0135610 | A1* | 4/2024 | Kolkin | G06T 11/60 |
| 2024/0135611 | A1* | 4/2024 | Costin | G06T 11/60 |
| 2024/0168617 | A1* | 5/2024 | Lin | G06V 10/26 |
| 2024/0169502 | A1* | 5/2024 | Cohen | G06V 10/86 |
| 2024/0169622 | A1* | 5/2024 | Xie | G06T 11/00 |
| 2024/0169631 | A1* | 5/2024 | Kim | G06T 11/001 |
| 2024/0171848 | A1* | 5/2024 | Figueroa | G06V 10/764 |
| 2024/0296607 | A1* | 9/2024 | Li | G06F 40/56 |
| 2024/0331236 | A1* | 10/2024 | Li | G06T 5/60 |
| 2024/0338799 | A1* | 10/2024 | Li | G06F 40/126 |
| 2024/0355018 | A1* | 10/2024 | Aggarwal | G06T 11/001 |
| 2024/0362842 | A1* | 10/2024 | Ravi | G06T 5/70 |

FOREIGN PATENT DOCUMENTS

| | | | |
|---|---|---|---|
| WO | 2022131490 A1 | 6/2022 | |
| WO | WO-2024233814 A1 * | 11/2024 | G06T 11/00 |

OTHER PUBLICATIONS

U.S. Appl. No. 63/465,226, Specification, May 9, 2023. (Year: 2023).*

Avrahami, et al., "Blended Latent Diffusion", ACM Trans. Graph., vol. 1, No. 1, article 1, arXiv:2206.02779v2, Apr. 30, 2023, pp. 1:1-1:27.

Brooks, et al., "InstructPix2Pix: Learning to Follow Image Editing Instructions", arXiv:2211.09800v2, Jan. 18, 2023, pp. 1-15.

Examination Report No. 1 for Australian patent application No. 2023229567 mailed Oct. 10, 2023, pp. 1-5.

Qian Wang et al., "MDP: A Generalized Framework for Text-Guided Image Editing by Manipulating the Diffusion Path", arxiv.org, Cornell University Library, 201 Olin Library Cornell University Ithaca, NY 14853, Mar. 29, 2023 (Mar. 29, 2023), XP091471543, pp. 1-27.

Shaoan Xie et al., "SmartBrush: Text and Shape Guided Object Inpainting with Diffusion Model", 2023 IEEE/CVF Conference on Computer Vision and Pattern Recognition (CVPR), IEEE, Jun. 17, 2023 (Jun. 17, 2023), pp. 22428-22437, XP034402175, [retrieved on Aug. 22, 2023].

* cited by examiner

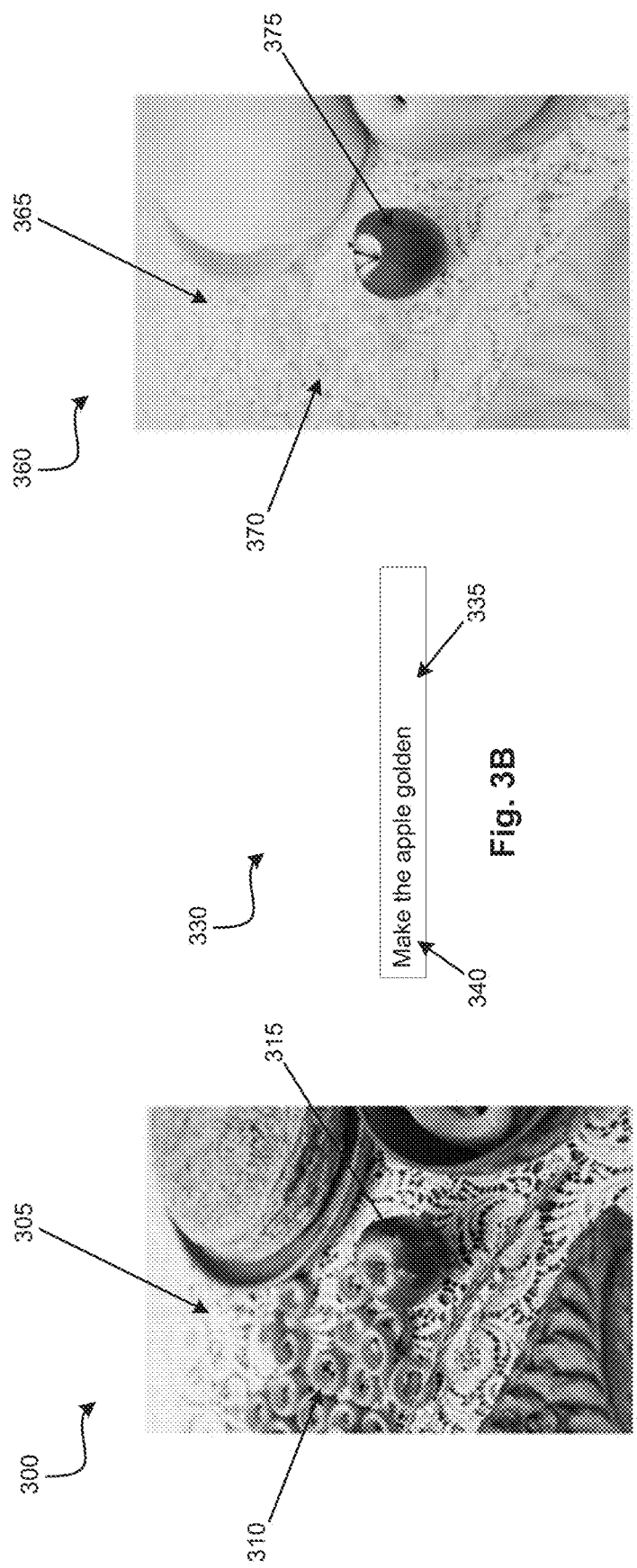

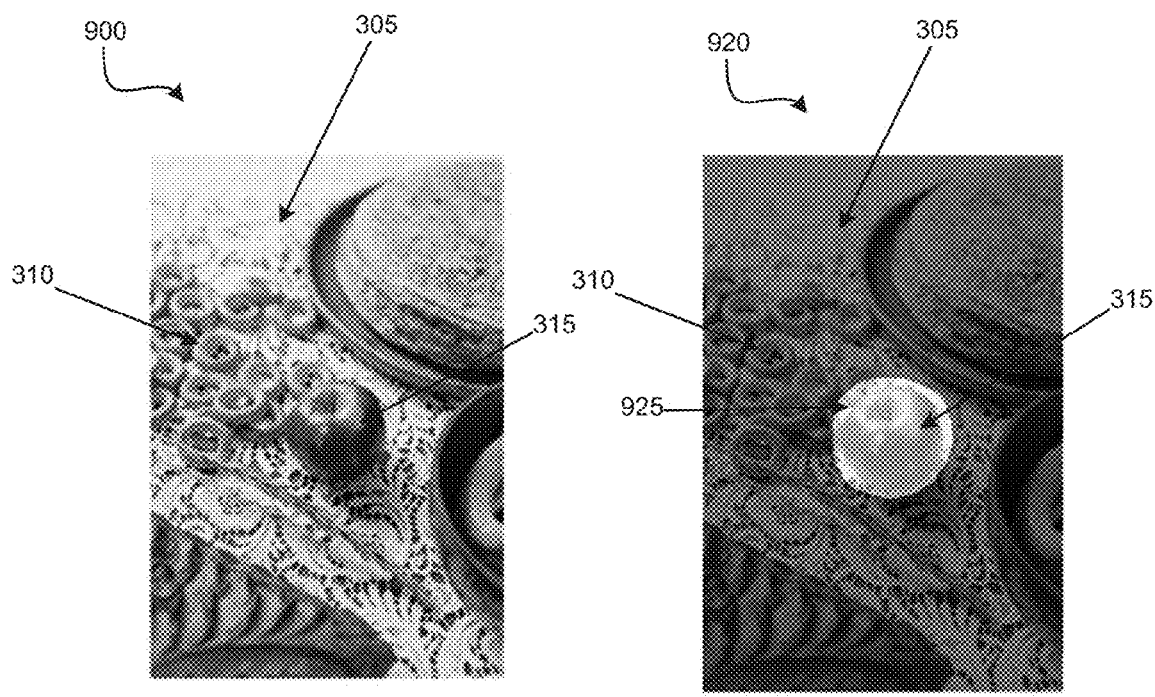
Fig. 9A
Fig. 9B
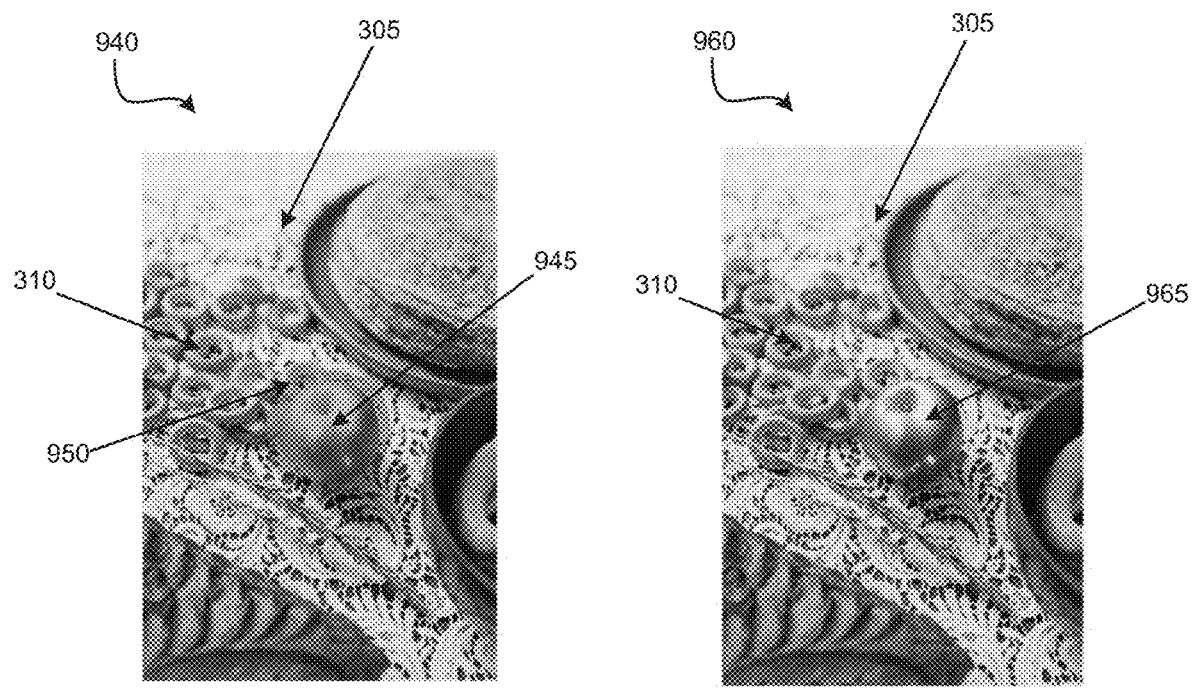
Fig. 9C
Fig. 9D

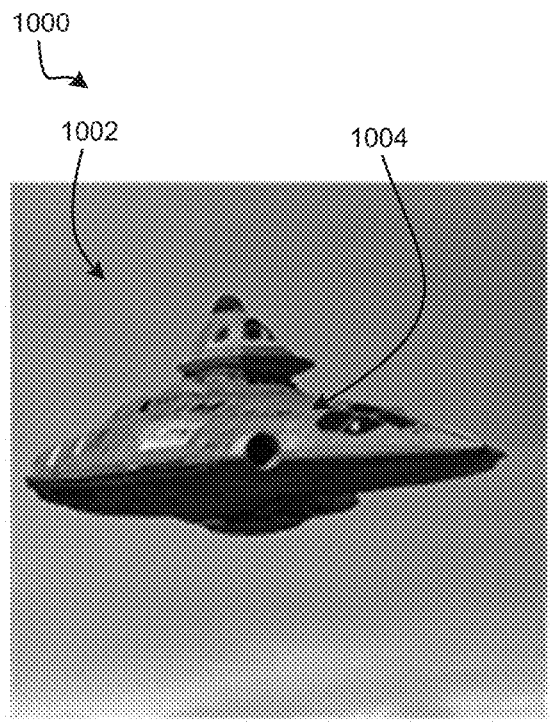
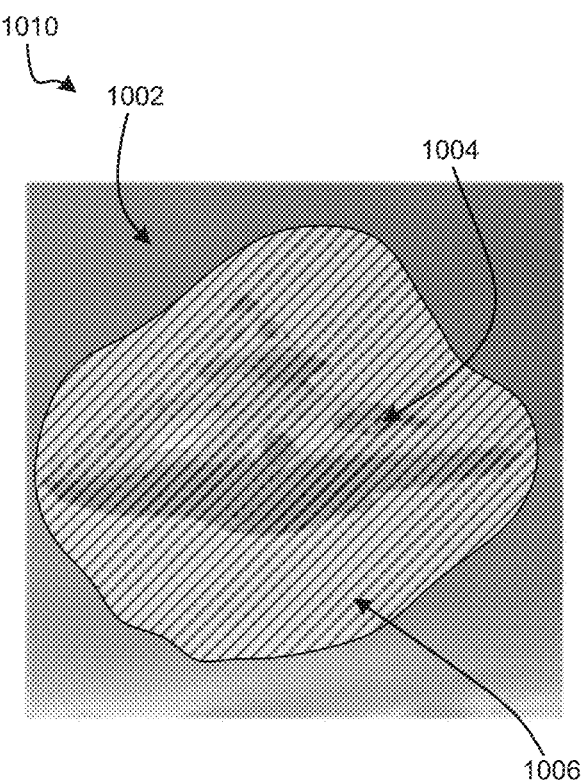
Fig. 10A                                   Fig. 10B
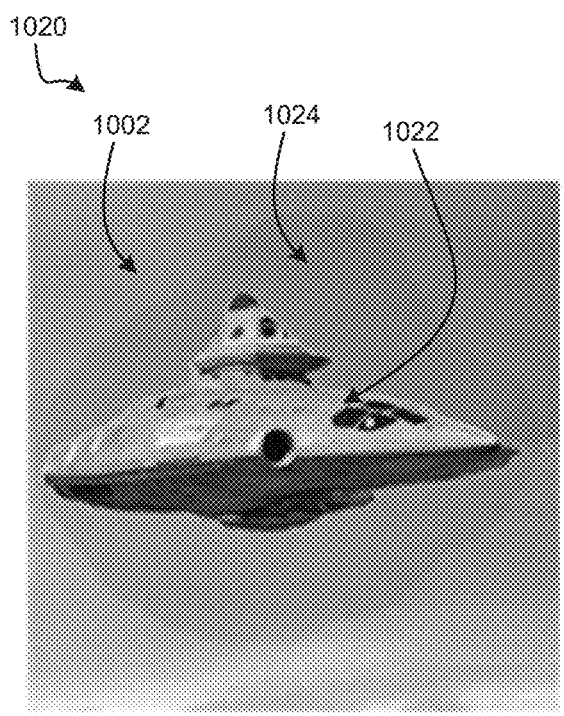
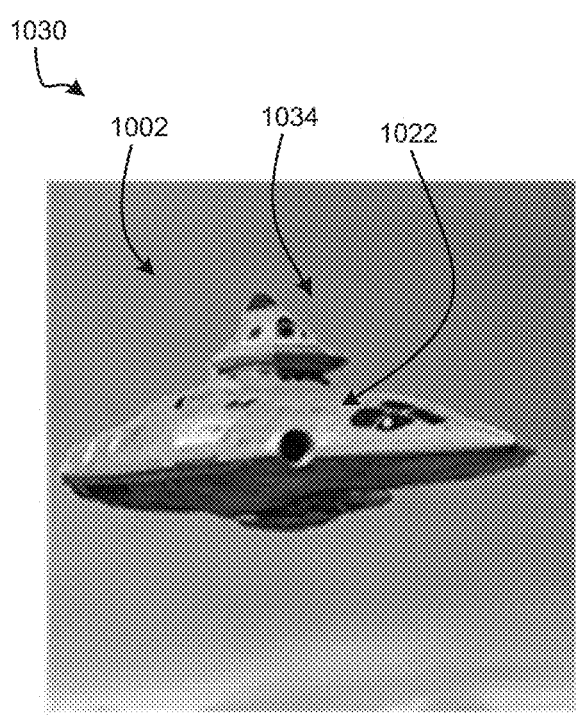
Fig. 10C                                   Fig. 10D

METHODS AND SYSTEMS FOR PROMPT-BASED IMAGE EDITING

CROSS-REFERENCE TO RELATED APPLICATIONS

This application is a U.S. Non-Provisional application that claims priority to and the benefit of Australian Patent Application No. 2023229567, filed Sep. 14, 2023, that is hereby incorporated by reference in its entirety.

TECHNICAL FIELD

Described embodiments relate to systems, methods and computer program products for performing prompt-based image editing. In particular, described embodiments relate to systems, methods and computer program products for automatic editing of digital images based on a prompt.

BACKGROUND

Digital image editing processes can be used to produce a wide variety of modifications to digital images. For example, colour properties of the image may be modified, image elements such as foreground or background objects may be removed or replaced, or image elements may be added.

Historically, digital image editing has been performed manually using digital image editing software to manipulate the image. However, this can be extremely long and tedious work if a quality result is desired, especially when working with large areas. This is because this method can require a pixel-level manipulation of the image to retain a realistic and seamless result. Some automated approaches have been developed, but these often produce an unrealistic or undesirable result.

It is desired to address or ameliorate one or more shortcomings or disadvantages associated with prior systems and methods for performing image editing, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method of performing prompt-based image editing, the method comprising:
accessing an image;
receiving a selected area of the image;
receiving a prompt, wherein the prompt is indicative of an editing instruction;
generating a latent by transforming the image into visual noise;
predicting, based on the latent and the prompt, a noise image corresponding to the latent;
subtracting at least a portion of the noise image from the latent to generate an updated latent;
generating a noisy representation of the image;
generating a masked latent based on the noisy representation, the updated latent and selected area, wherein the masked latent comprises the updated latent in the areas corresponding to the selected area, and the noisy representation in the areas that do not correspond to the selected area.

Some embodiments further comprise repeating the steps of a denoising loop over a series of timesteps, wherein the denoising loop comprises the steps of predicting a noise image, generating an updated latent, generating a noisy representation and generating a masked latent.

According to some embodiments, given a current timestep t, predicting the noise image comprises predicting the visual noise that would be present in the latent at a timestep t+1 during a noising process.

In some embodiments, generating the noisy representation of the first image comprises adding noise to the image based on the current timestep t.

In some embodiments, the timestep t is decremented after each iteration.

In some embodiments, the denoising loop is repeated between 15 and 40 times.

In some embodiments, the denoising loop is repeated between 20 and 30 times.

According to some embodiments, the portion of the noise image to subtract from the latent is determined based on a noise schedule.

In some embodiments, the step of predicting the noise image is performed by a diffusion model.

According to some embodiments, the diffusion model is trained using sets of data comprising a first image, an editing instruction, and a second image edited based on the editing instruction.

According to some embodiments, the diffusion model is trained by being caused to add noise to the first image with timesteps t increasing, then caused to remove noise by decrementing timesteps t to generate the second edited image Some embodiments further comprise determining an encoding of the received prompt, wherein the step of predicting a noise image is done using the encoding of the prompt.

Some embodiments further comprise cropping the accessed image based on the selected area.

Some embodiments further comprise altering the resolution of the accessed image to a working resolution before generating the latent, wherein the working resolution is a lower resolution that the resolution of the accessed image.

Some embodiments further comprise mapping pixel information corresponding to the accessed image to a latent space before generating the latent, such that the latent is a representation of the image in the latent space.

Some embodiments further comprise inserting the generated masked latent into the accessed image to produce an output image.

Some embodiments further comprise performing a pixel melding process on the generated masked latent to blend the generated masked latent with the accessed image.

Some embodiments further comprise outputting the image by saving the output image to a memory location, displaying the output image to a user, or sending the output image to an external device.

Some embodiments further comprise generating a binary mask based on the selected area, and using the binary mask to generate the masked latent.

In some embodiments, the masked latent is computed based on the equation $$\text{masked\_latent} = \text{mask} * \text{latent} + (1 - \text{mask}) * \text{noisy\_representation},$$

where mask represents a mask generated based on the selected area, latent represents the updated latent, and noisy_representation represents the noisy representation.

Some embodiments further comprise receiving an indication that the prompt relates to a localised edit.

In some embodiments, the first visual noise is Gaussian noise.

Some embodiments relate to a non-transitory computer-readable storage medium storing instructions which, when executed by a processing device, cause the processing device to perform the method of some other embodiments.

Some embodiments relate to a computing device comprising:
   the non-transitory computer-readable storage medium of some other embodiments; and
   a processor configured to execute the instructions stored in the non-transitory computer-readable storage medium.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope.

FIGS. 3A to 3C show a second series of example images that show the results of localised prompt-based image editing, according to some known methods;

FIG. 9A to 9D are a second set of example images showing the results of performing the method of FIG. 5, according to some embodiments;

FIGS. 10A to 10D are example images showing a melding process, according to some embodiments.

DESCRIPTION OF EMBODIMENTS

Described embodiments relate to systems, methods and computer program products for performing prompt-based image editing. In particular, described embodiments relate to systems, methods and computer program products for automatic editing of digital images based on a prompt.

Prompt-based image editing refers to editing an image automatically based on an input prompt. Manual techniques to edit images can be time intensive and often require a high degree of skill to produce a result that looks convincing. Existing prompt-based image editing techniques can be used to perform some image editing processes, such as automatic inpainting processes that can be used for inserting or removing image elements. However, some prompt-based image editing techniques produce an unrealistic or undesirable result. This is particularly true when the supplied prompt is directed toward just a portion of the image to be edited, such as a single object within the image. For example, when a prompt-based editing technique is used to attempt to edit the colour of a discrete image element, the results often change the colour of the entire image, or image elements outside the element to be edited.

Some of the described embodiments provide a prompt-based image editing technique that is capable of editing specific image elements in a more realistic way when compared to some previously known image editing methods. Specifically, some embodiments provide a prompt-based image editing technique that can better confine edits of an image to specific image elements, when compared to some previously known image editing techniques. This is achieved by introducing a masking step during the denoising process performed by a model trained to execute prompt-based image editing.

In the following description, the term "pixel information" as it relates to an image may comprise any information that is indicative of, associated with, derived/derivable from, comprised within and/or comprised of information that is indicative of the pixels that an image is comprised from. For example, pixel information may be Red, Green, Blue (RGB) values of subpixels that make up a single pixel. In some embodiments, pixel information may include a numerical representation and/or transformation of the RGB values of the subpixels, such as a latent mapping of the RGB values of the subpixels mapped onto a lower-dimensional latent space, for example. Pixel information may, in some embodiments, include any other type of information or representation of information that is indicative of the RGB values of a pixel and/or subpixels.

FIGS. 1A to 1D show examples of the results of some previously known prompt-based image editing techniques.

Figures 1A, 1B:
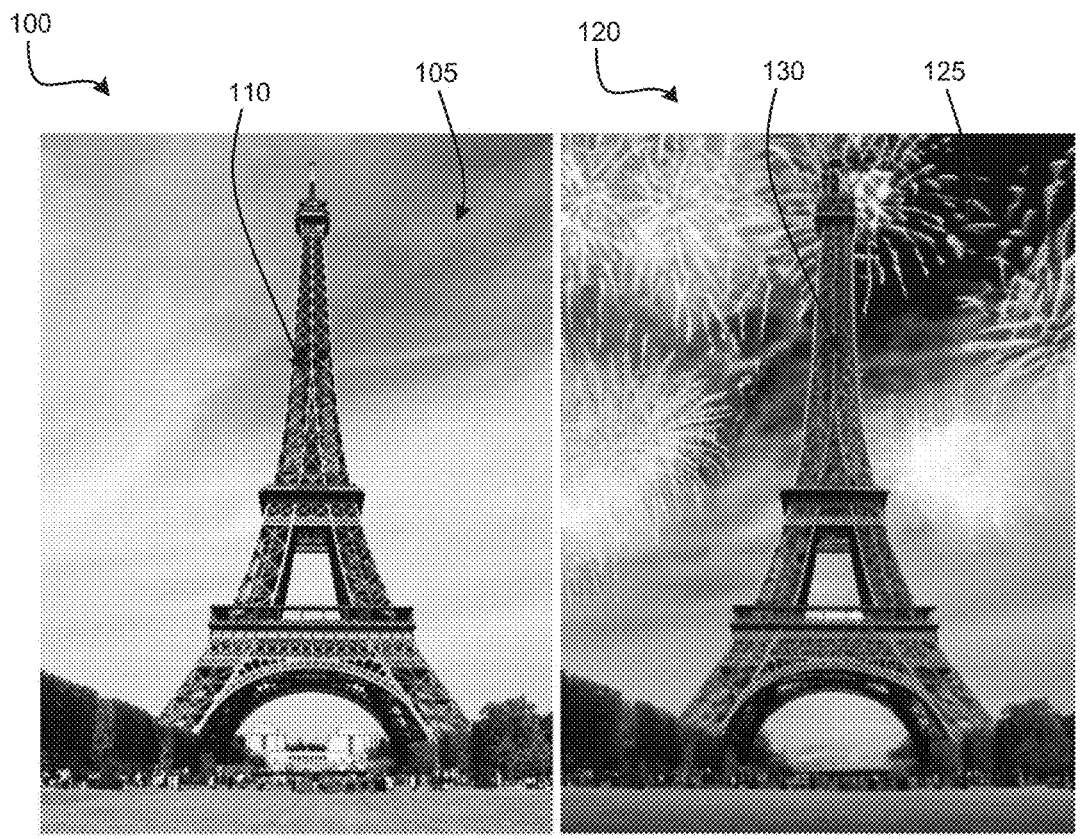
FIGS. 1A to 1D show example images that show the results of global prompt-based image editing, according to some known methods.

FIG. 1A shows an example original image 100 comprising a background 105 and a subject, being the Eiffel tower 110. Background 105 shows a blue cloudy sky.

FIG. 1B shows an example edited image 120. Image 120 is an edited version of image 100, and has been generated using a prompt-based image editing technique performed by an image editing application according to some known techniques. For example, image 120 may have been generated using a diffusion machine learning (ML) model, which is a neural network model trained or otherwise configured to de-noise images containing Gaussian noise by learning to reverse the diffusion process. Image 120 may have been generated using the techniques as described in Brooks, T., Holynski, A. and Efros, A. A., 2023; "Instructpix2pix: Learning to follow image editing instructions", published in *Proceedings of the IEEE/CVF Conference on Computer Vision and Pattern Recognition* (pp. 18392-18402) ("Brooks et al.") the contents of which are herein incorporated by reference in their entirety.

Image 120 has been generated by supplying an appropriately trained ML model with the original image 100 and the text prompt "Add fireworks to the sky". The result of the editing is that image 120 now has an edited background 125 showing a dark night sky filled with fireworks, and an edited Eiffel tower 130 which has changed in colour to match the lighting of the edited background 125.

Figures 1C, 1D:
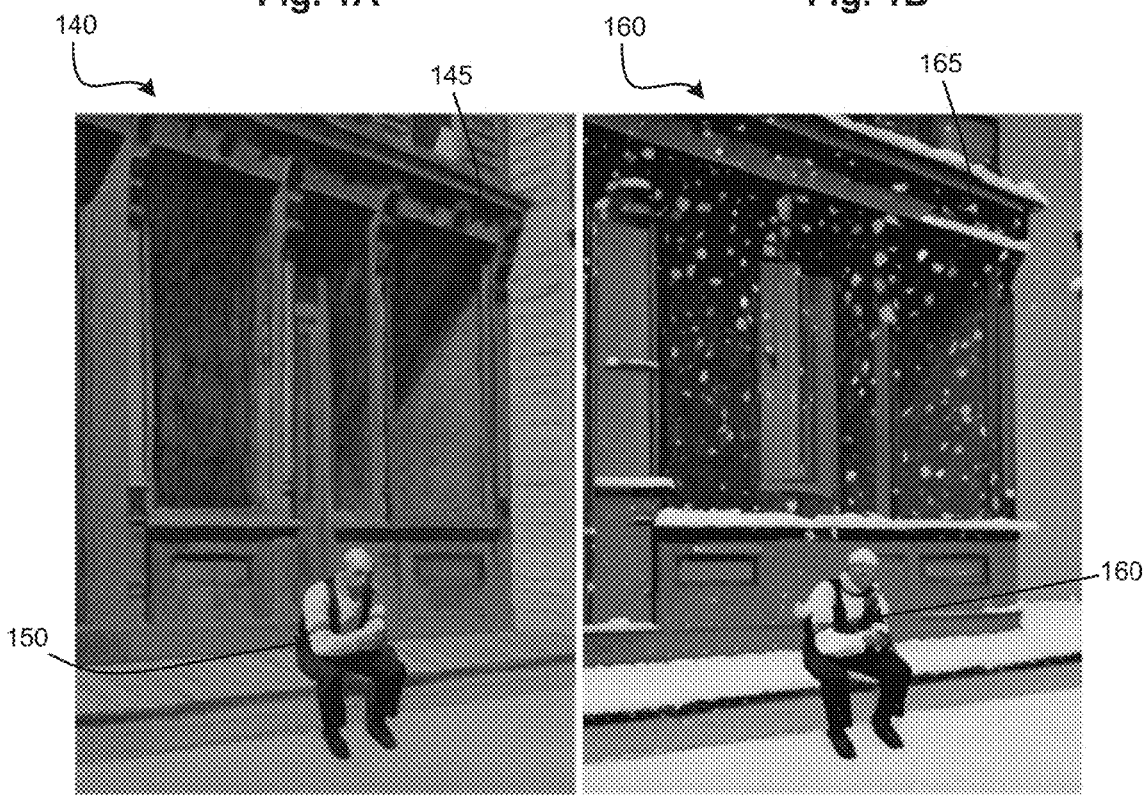

FIG. 1C shows an example original image 140 comprising a background 145 and a subject, being a man 150. Background 145 shows a blue shopfront, and man 150 is sitting on a ledge in front of the shopfront. The man is wearing a white shirt with sleeves, and a dark vest and pants.

FIG. 1D shows an example edited image 160. Image 160 is an edited version of image 170, and has been generated using a prompt-based image editing technique performed by an image editing application according to some known techniques. For example, image 160 may have been generated using a diffusion machine learning (ML) model, which is a neural network model trained or otherwise configured to de-noise images containing Gaussian noise by learning to reverse the diffusion process. Image 120 may have been generated using the techniques as described in Brooks et al.

Image 160 has been generated by supplying an appropriately trained ML model with the original image 140 and the text prompt "What would it look like if it were snowing?". The result of the editing is that image 160 now has an edited background 165 showing snow falling in front of the shopfront and building up on the ledge, and an edited man 160 who is now wearing a hat and scarf.

The edits shown in FIGS. 1B and 1D have been applied to the entirety of the image, and result in a relatively realistic edited image.

FIGS. 2A to 2C and 3A to 3C show examples of the unrealistic and undesirable appearance of edited images that can occur when using existing techniques for prompt-based image editing, where the prompt relates to a discrete image element.

Figure 2C:
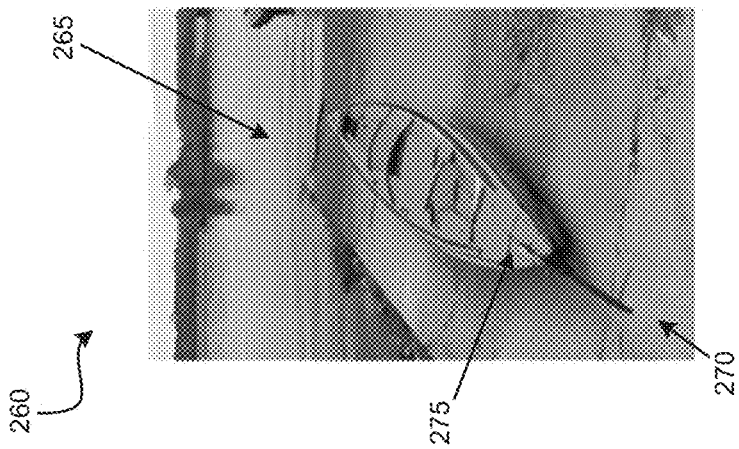
FIGS. 2A to 2C show a first series of example images that show the results of localised prompt-based image editing, according to some known methods.
Figure 2B:
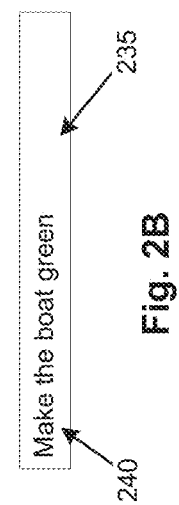
Figure 2A:
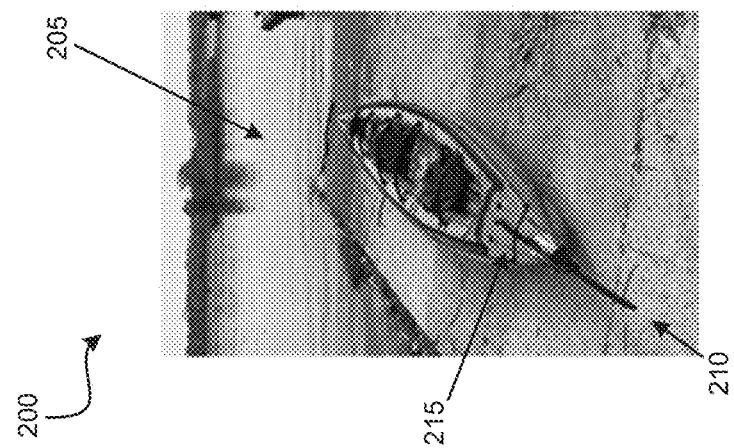

FIG. 2A shows an example original image 200 comprising a background 205 and a subject, being a kayak 215. In the illustrated example, the kayak 215 is resting on a concrete landing 210. Kayak 215 has a red exterior, a grey interior, and some black details. Background 205 shows a body of water with green shrubs or trees in the distance, and a portion of sky visible above a horizon. Image 200 may be an image selected or uploaded by a user for editing using an image editing application.

FIG. 2B shows a user interface element 230. User interface element 230 may be displayed by a device executing an image editing application, such as the application being used by a user to edit image 200. User interface element 230 comprises a text entry field 235 for allowing a user to enter a text prompt. In some embodiments, the text entry field 235 may appear upon selection of a particular editing tool. In some embodiments, the text entry field 235 may be a permanent component of the user interface of the image editing application. In the illustrated embodiment, the user has entered prompt 240. The prompt 240 reads "Make the boat green".

FIG. 2C shows an example edited image 260. Image 260 is an edited version of image 200, and has been generated using a prompt-based image editing technique performed by an image editing application according to some known techniques, using prompt 240. For example, image 260 may have been generated using a diffusion machine learning (ML) model, which is a neural network model trained or otherwise configured to de-noise images containing Gaussian noise by learning to reverse the diffusion process. Image 260 may have been generated using the techniques as described in Brooks et al.

However, the editing of image 200 to generate image 260 has produced some undesirable results. Image 260 shows a background 265 and a subject, being a kayak 275. Kayak 275 is resting on a landing 270. In accordance with prompt 240, kayak 275 has been turned to a green colour compared with kayak 215. However, the remaining elements of image 260 have also been altered. The background 265 and landing 270 have become significantly greener compared to background 205 and landing 210. In other words, the edits made to kayak 215/275 have not been contained to that image element, but have been applied to the image 200/260 as a whole.

Such a result may occur when a prompt 240 is a localised prompt that specifies a specific locality to which edits are to be applied, such as a specific subject, object or image element. This may be particularly noticeable where the prompt relates to a change to the colour of the specified locality, subject, object or element. Image elements outside those referred to in a prompt may be undesirably edited, which may include edits to change their colour, brightness, contrast, saturation and/or other visual characteristics.

FIGS. 3A to 3C show another such example.

FIG. 3A shows an example original image 300 comprising a background 305 and a subject, being an apple 315. In the illustrated example, the apple is red in colour and is resting on a white lace tablecloth that forms the background 305. Other food items are resting on the tablecloth, such as sushki 310. Image 300 may be an image selected or uploaded by a user for editing using an image editing application.

FIG. 3B shows a user interface element 330. User interface element 330 may be displayed by a device executing an image editing application, such as the application being used by a user to edit image 300. User interface element comprises a text entry field 335 for allowing a user to enter a text prompt. In some embodiments, the text entry field 335 may appear upon selection of a particular editing tool. In some embodiments, the text entry field 335 may be a permanent component of the user interface of the image editing application. In the illustrated embodiment, the user has entered prompt 340. The prompt 340 reads "Make the apple golden".

FIG. 3C shows an example edited image 360. Image 360 is an edited version of image 300, and has been generated using a prompt-based image editing technique performed by an image editing application according to some known techniques, using prompt 340. For example, image 360 may have been generated using a diffusion machine learning (ML) model, which is a neural network model trained or otherwise configured to de-noise images containing Gaussian noise by learning to reverse the diffusion process. Image 360 may have been generated using the techniques as described in Brooks et al.

However, the editing of image 300 to generate image 360 has produced some undesirable results. Image 360 shows a background 365 and a subject, being an apple 375. Apple 375 is resting on a tablecloth making up background 365, along with other food items such as sushki 370. In accordance with prompt 340, parts of apple 375 have been edited to a more golden colour compared with apple 315. However, the remaining elements of image 360 have also been altered. The background 365, sushki 370 and other food items have become significantly yellower compared to background 305 and sushki 310. In other words, the edits made to apple 315/375 have not been contained to that image element, but have been applied to the image 300/360 as a whole.

Systems and methods as described below with reference to FIGS. 4 to 11 illustrate an approach that may avoid some of the shortcomings described above with reference to FIGS. 2A to 3C, in some embodiments.

Figure 4:
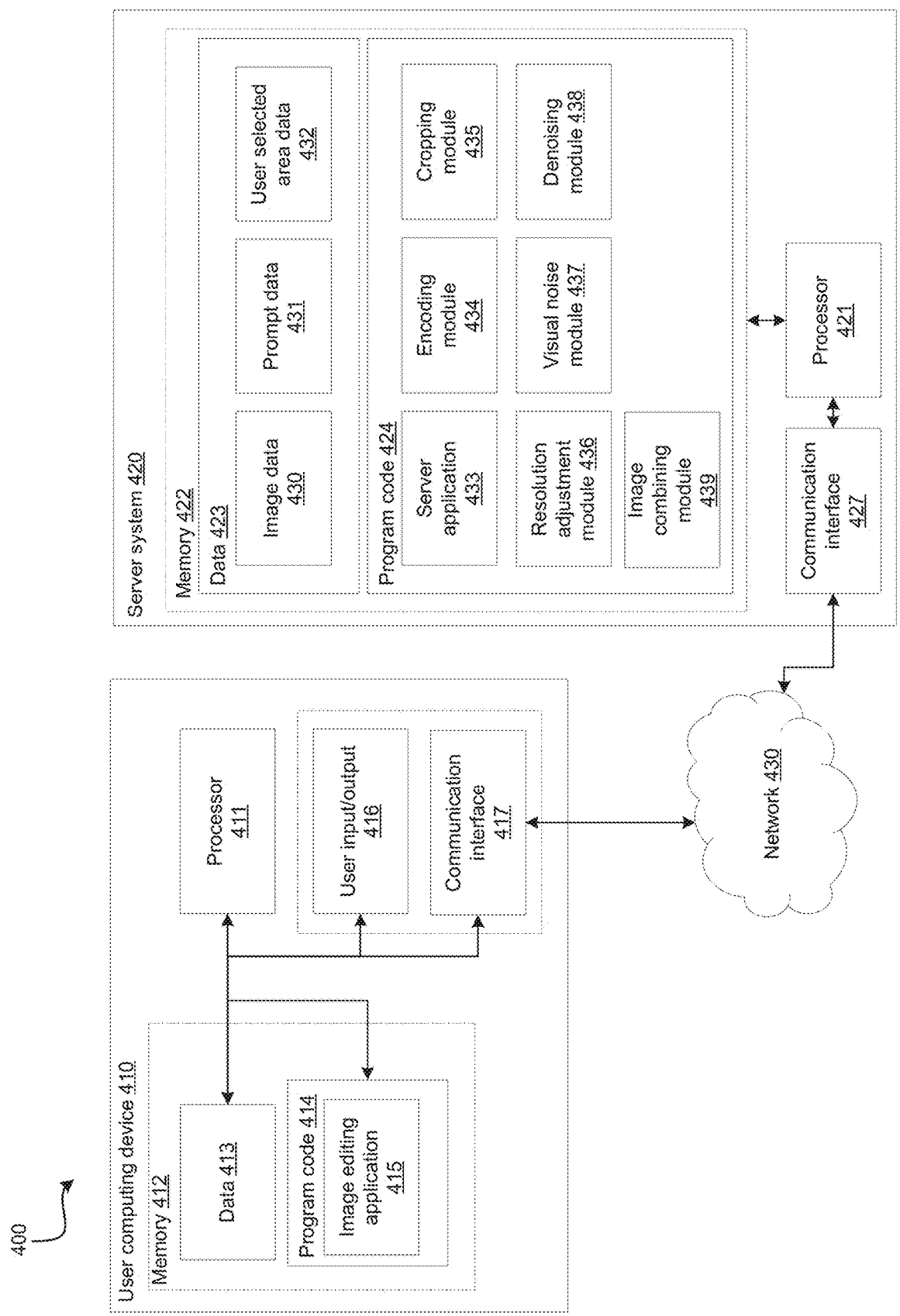
FIG. 4 is a block diagram of a system for performing prompt-based image editing according to some embodiments.

FIG. 4 shows an arrangement of system components, including hardware and software of systems that may be used to perform the presently disclosed methods. It would be readily understood by the person skilled in the art that the system of FIG. 4 is simply one embodiment of a number of potential embodiments that would be suitable for performing the present methods.

FIG. 4 is a block diagram showing an example system 400 that may be used for performing prompt-based editing according to some described embodiments. System 400 comprises a user computing device 410 which may be controlled by a user wishing to edit one or more images. In the illustrated embodiment, system 400 further comprises a server system 420. User computing device 410 may be in communication with server system 420 via a network 430. However, in some embodiments, user computing device 410 may be configured to perform the described methods independently, without access to a network 430 or server system 420.

User computing device 410 may be a computing device such as a personal computer, laptop computer, desktop computer, tablet, or smart phone, for example. User computing device 410 comprises a processor 411 configured to read and execute program code. Processor 411 may include one or more data processors for executing instructions, and may include one or more of a microprocessor, microcontroller-based platform, a suitable integrated circuit, and one or more application-specific integrated circuits (ASICs).

User computing device 410 further comprises at least one memory 412. Memory 412 may include one or more memory storage locations which may include volatile and non-volatile memory, and may be in the form of ROM, RAM, flash or other memory types. Memory 412 may also comprise system memory, such as a BIOS.

Memory 412 is arranged to be accessible to processor 411, and to store data that can be read and written to by processor 411. Memory 412 may also contain program code 414 that is executable by processor 411, to cause processor 411 to perform various functions. For example, program code 414 may include an image editing application 415. Processor 421 executing image editing application 415 may be caused to perform aspects of prompt-based image editing methods, as described in further detail below with reference to FIGS. 5 to 11.

According to some embodiments, image editing application 415 may be a web browser application (such as Chrome, Safari, Internet Explorer, Opera, or any other alternative web browser application) which may be configured to access web pages that provide image editing functionality via an appropriate uniform resource locator (URL).

Program code 414 may include additional applications that are not illustrated in FIG. 4, such as an operating system application, which may be a mobile operating system if user computing device 410 is a mobile device, a desktop operating system if user computing device 410 is a desktop device, or an alternative operating system.

User computing device 410 may further comprise user input and output peripherals 416. These may include one or more of a display screen, touch screen display, mouse, keyboard, speaker, microphone, and camera, for example. User I/O 416 may be used to receive data and instructions from a user, and to communicate information to a user.

User computing device 410 may further comprise a communications interface 417, to facilitate communication between user computing device 410 and other remote or external devices. Communications module 417 may allow for wired or wireless communication between user computing device 410 and external devices, and may use Wi-Fi, USB, Bluetooth, or other communications protocols. According to some embodiments, communications module 417 may facilitate communication between user computing device 410 and server system 420 via a network 430, for example.

Network 430 may comprise one or more local area networks or wide area networks that facilitate communication between elements of system 400. For example, according to some embodiments, network 430 may be the internet. However, network 430 may comprise at least a portion of any one or more networks having one or more nodes that transmit, receive, forward, generate, buffer, store, route, switch, process, or a combination thereof, etc. one or more messages, packets, signals, some combination thereof, or so forth. Network 430 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, or some combination thereof.

Server system 420 may comprise one or more computing devices and/or server devices (not shown), such as one or more servers, databases, and/or processing devices in communication over a network, with the computing and/or server devices hosting one or more application programs, libraries, APIs or other software elements. The components of server system 420 may provide server-side functionality to one or more client applications, such as image editing application 415. The server-side functionality may include operations such as user account management, login, and content creation functions such as image editing, saving, publishing, and sharing functions. According to some embodiments, server system 420 may comprise a cloud based server system. While a single server system 420 is shown, server system 420 may comprise multiple systems of servers, databases, and/or processing devices. Server system 420 may host one or more components of a platform for performing image editing according to some described embodiments.

Server system 420 may comprise at least one processor 421 and a memory 422. Processor 421 may include one or more data processors for executing instructions, and may include one or more of a microprocessor, microcontroller-based platform, a suitable integrated circuit, and one or more application-specific integrated circuits (ASIC's). Memory 422 may include one or more memory storage locations, and may be in the form of ROM, RAM, flash or other memory types.

Memory 422 is arranged to be accessible to processor 421, and to contain data 423 that processor 421 is configured to read and write to. Data 423 may store data such as user account data, image data, and data relating to image editing tools, such as machine learning models trained to perform image editing functions.

In the illustrated embodiment, data 423 comprises image data 430, prompt data 431 and user selected area data 432. While these are illustrated as residing in memory 422 of server system 420, in some embodiments some or all of this data may alternatively or additionally reside in memory 412 of user computing device 410, or in an alternative local or remote memory location.

Image data 430 may store image data relating to an image to be edited by image editing application 415. Image data 430 may be received from user computing device 410 executing image editing application 415 in response to a user selecting or uploading an image to be edited. For example, referring to the examples shown in FIGS. 2A and 3A, images 200 and/or 300 may be stored in image data 430. Image data 430 may additionally or alternatively store image data relating to images that are in the process of being edited, or final edited images.

Prompt data 231 may be received from user computing device 410 in response to a user entering a prompt while executing image editing application 415, in order to perform an image editing function. For example, in the example illustrated in FIG. 2A, the user has entered the prompt 240 "Make the boat green". Prompt 240 may be stored in prompt data 228 as a string of text.

User selected area data 432 may be received from user computing device 410 in response to a user selecting an area of an image while executing image editing application 415, in order to perform an image editing function in that area. According to some embodiments, a user wishing to edit an image may interact with user I/O 416 of user computing device 410 displaying the image to indicate which area of the image they wish to edit. For example, the user may use a brush tool, trace tool, or other tool to digitally select, trace, circle, or "paint" over the image element via the user interface to produce a user selected area, which can be used as a mask to perform an editing method as described in further detail below. The user selected area may be stored as user selected area data 432.

In some cases, the user selected area may be stored to user selected area data 432 as image data representing a mask defined by the user selected area. For example, a binary mask may be generated, where a first pixel value may represent areas of the image falling within the user selected area and a second pixel value different to the first pixel value may be used to represent areas falling outside of the user selected area. In some embodiments, white pixels may represent the user selected area, being the area selected for editing, and black pixels may represent areas outside the user selected area where no editing it to be performed.

An example of a user selected area is shown in FIGS. 6C, 7B, 8B, 9B and 10B and is described in further detail below with reference to those images.

Memory 422 further comprises program code 424 that is executable by processor 421, to cause processor 421 to execute workflows. For example, program code 424 comprises a server application 433 executable by processor 421 to cause server system 420 to perform server-side functions. According to some embodiments, such as where image editing application 415 is a web browser, server application 433 may comprise a web server such as Apache, IIS, NGINX, GWS, or an alternative web server. In some embodiments, the server application 433 may comprise an application server configured specifically to interact with image editing application 415. Server system 420 may be provided with both web server and application server modules.

Program code 424 may also comprise one or more code modules, such as one or more of an encoding module 434, a cropping module 435, a resolution adjustment module 436, a visual noise module 437, a denoising module 438 and an image combining module 439.

As described in further detail below with reference to step 540 of method 500, executing encoding module 434 may cause processor 421 to perform a tokenisation, encoding and/or embedding process on an input from a user, which may be a prompt, in some embodiments. According to some embodiments, processor 421 executing encoding module 434 may be caused to generate a prompt representation based on the user input. For example, this may be done by determining a lower-dimensional representation of the input that may be interpretable by a machine trained model for generating an image. The prompt representation may be determined using a text encoder such as OpenAI's CLIP text encoder. The prompt representation may be an encoding or an embedding of a prompt stored in prompt data 431, for example.

Executing cropping module 435 may cause processor 421 to perform a cropping process on a supplied image, as described in further detail below with reference to step 530 of method 500. Specifically, cropping module 435 may be configured to apply a cropping process on an image retrieved from image data 430 based on a user selected area retrieved from user selected area data 432. Some methods of image editing, such as those described below with reference to FIGS. 5 to 11, may be performed on a cropped section of the original image. Cropping an image prior to editing may result in a higher quality edited image, as described in further detail below. Where a user selected area as retrieved from user selected area data 432 is substantially smaller than the size of the image to be edited as retrieved from image data 430, the image to be edited may be cropped to a smaller size, with the cropped image being larger than and including all of the user selected area An example of an image being cropped based on a user selected area is shown in FIGS. 7C and 7D, and described in further detail below with reference to those images.

Executing resolution adjustment module 436 may cause processor 421 to adjust the resolution of a supplied image, as described in further detail below with reference to steps 535 and 580 of method 500. This may be used to convert an original image, such as an image retrieved from image data 430, into a working resolution, or to convert a working resolution image back to an original image resolution. For example, in some embodiments, the working resolution may be between 448×448 pixels and 640×640 pixels. Where the supplied image is not a square, resolution adjustment module 436 may be configured to adjust the resolution such that the working resolution image has the same number of pixels as a 448×448 to 640×640 square of pixels. According to some embodiments, resolution adjustment module 436 may be configured to adjust the resolution of the supplied image so that number of pixels in the working resolution image is a multiple of 32. The working resolution image or lower compressed representation of the image produced by resolution adjustment module 436 may be referred to as the latent of the image, the latent representation of the image or the latent mapping of the image. The latent space represents the data in which the relationships between different data points are more easily understood and analysed. Resolution adjustment module 436 may function as an encoder to compute the lower dimension compressed representation of a supplied image, and as a decoder to convert the lower dimension compressed representation back into the pixel space of the original supplied image.

Executing visual noise module 437 may cause processor 421 to add randomly generated signal noise to pixel information of a supplied image or a supplied latent of the image, as described in further detail below with reference to step 545 of method 500. The signal noise may be Gaussian noise. In some embodiments, visual noise module 437 may be configured to add a certain level, degree or amount of visual noise to pixel information of a supplied image or a supplied latent of the image based on a noise strength parameter. An example illustrating the process of adding noise to an image is described in further detail below with reference to FIG. 7E.

Executing denoising module 438 may cause processor 421 to perform an automated denoising process on a supplied image in order to perform an editing process. This is described in further detail below with reference to steps 550 to 575 of method 500. Denoising module 438 may comprise or access a machine learning (ML) model to perform the denoising, which may be a diffusion ML model in some embodiments. A diffusion ML model may comprise a neural network model trained or otherwise configured to de-noise images containing noise, such as Gaussian noise, by learning to reverse the diffusion process. Specifically, a diffusion ML model may be trained by adding noise to an image during a forward process until the image consists of pure noise. Noise may be added to the image over a number of timesteps. In other words, the model may be trained by causing the model to destroy training data images by the successive addition of noise, and then causing the model to recover the data by reversing the noising process. This process is described in further detail below with reference to FIG. 11. Once trained, the ML model can be used to generate image data by following a backwards or reverse process, in which the ML model starts with an image consisting of noise, and subtracts noise from the image to generate the image data. In some embodiments, the denoising process may be performed using a U-net. The U-net is a fully convolutional neural network and consists of a contracting path and an expansive path. The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path. In other words, an image is converted into a vector, but is then converted back from that vector into an image.

As described in further detail below with reference to steps 550 to 575 of method 500, denoising process may comprise inferring, by the U-net from generated visual noise, a first estimate of an image to be generated, based on the initial visual noise and a representation of a prompt. The first estimate may then be subtracted from the initial visual noise to generate a subsequent visual noise, which will then be fed back into the U-net, along with the representation of the prompt, to generate a second estimate of the image to be generated. This process may be repeated iteratively until a termination criteria is met, such as a decrementing time step counter reaching zero, or a predetermined amount of time elapsing, for example.

The ML model may be an ML model trained using the techniques as described in Brooks et al, and as described in further detail below with reference to FIG. 11.

The ML model may use a prompt representation as generated by encoding module 434 to guide the diffusion process. Specifically, the ML model may use the prompt representation to manipulate an image representation containing visual noise in a way that causes the noise to be transformed into an image corresponding to the prompt representation.

In some embodiments, the ML model may be a latent diffusion ML model, which is a diffusion ML model configured to perform the de-noising process on a mapping of the image to a lower-dimensional latent space, as described above with reference to resolution adjustment module 436. According to some embodiments, the ML model may be a stable diffusion ML model.

In some embodiments, the ML model may be a pre-trained and commercially available, open-use or open-source ML model, such as Open AI's DALL-E/DALL-E 2, Google's Imagen and/or CompVis' Stable Diffusion, for example.

Executing image combining module 439 may cause the processor 421 to combine two or more images together. In some embodiments, processor 421 may be caused to combine images together based on a mask, which may be generated based on user selected area data 432. According to some embodiments, executing image blending module 439 may cause processor 421 to perform a melding process on the pixel information of the images to be combined, such that the images blends naturally, and/or substantially unnoticeably together. According to some embodiments, this may comprise performing a pixel adjustment process as described in further detail below with reference to FIGS. 10A to 10D.

Encoding module 434, cropping module 435, resolution adjustment module 436, visual noise module 437, denoising module 438 and image combining module 439 may be software modules such as add-ons or plug-ins that operate in conjunction with the image editing application 415 to expand the functionality thereof. In alternative embodiments, modules 434, 435, 436, 437, 438, and/or 439 may be native to the image editing application 415. In still further alternative embodiments, modules 434, 435, 436, 437, 438, and/or 439 may be a stand-alone applications (running on user computing device 410, server system 420, or an alternative server system (not shown)) which communicate with the image editing application 415, such as over network 430.

Modules 434, 435, 436, 437, 438, and/or 439 have been described and illustrated as being part of/installed on the server system 420, and may be configured as an add-on or extension to server application 433, a separate, stand-alone server application that communicates with server application 433, or a native part of server application 433. Inputs, such as user interactions, the user prompt and/or the image that an element is to be edited, may be provided and/or received at/by the user computing device 410, and then transferred to server system 420, such that the prompt-based editing method may be performed by the components of the server system 420.

In some alternative embodiments (not shown), the functionality provided by one or more of modules 434, 435, 436, 437, 438, and/or 439 could alternatively be provided by user computing device 410, based on locally or remotely stored image data 430, prompt data 431 and user selected area data 432. One or more of modules 434, 435, 436, 437, 438, and/or 439 may reside as an add-on or extension to image editing application 415, a separate, stand-alone application that communicates with image editing application 415, or a native part of image editing application 415.

In alternate embodiments (not shown), all functions, including receiving the prompt, user selected area and image, may be performed by the server system 420. Or, in some embodiments, an application programming interface (API) may be used to interface with the server system 420 for performing the presently disclosed prompt-based image editing technique.

Server system 420 may also comprise a communications interface 427, to facilitate communication between server system 420 and other remote or external devices. Communications module 427 may allow for wired or wireless communication between server system 420 and external devices, and may use Wi-Fi, USB, Bluetooth, or other communications protocols. According to some embodiments, communications module 427 may facilitate communication between server system 420 and user computing device 410, for example.

Server system 420 may include additional functional components to those illustrated and described, such as one or more firewalls (and/or other network security components), load balancers (for managing access to the server application 433), and or other components.

Figure 5:
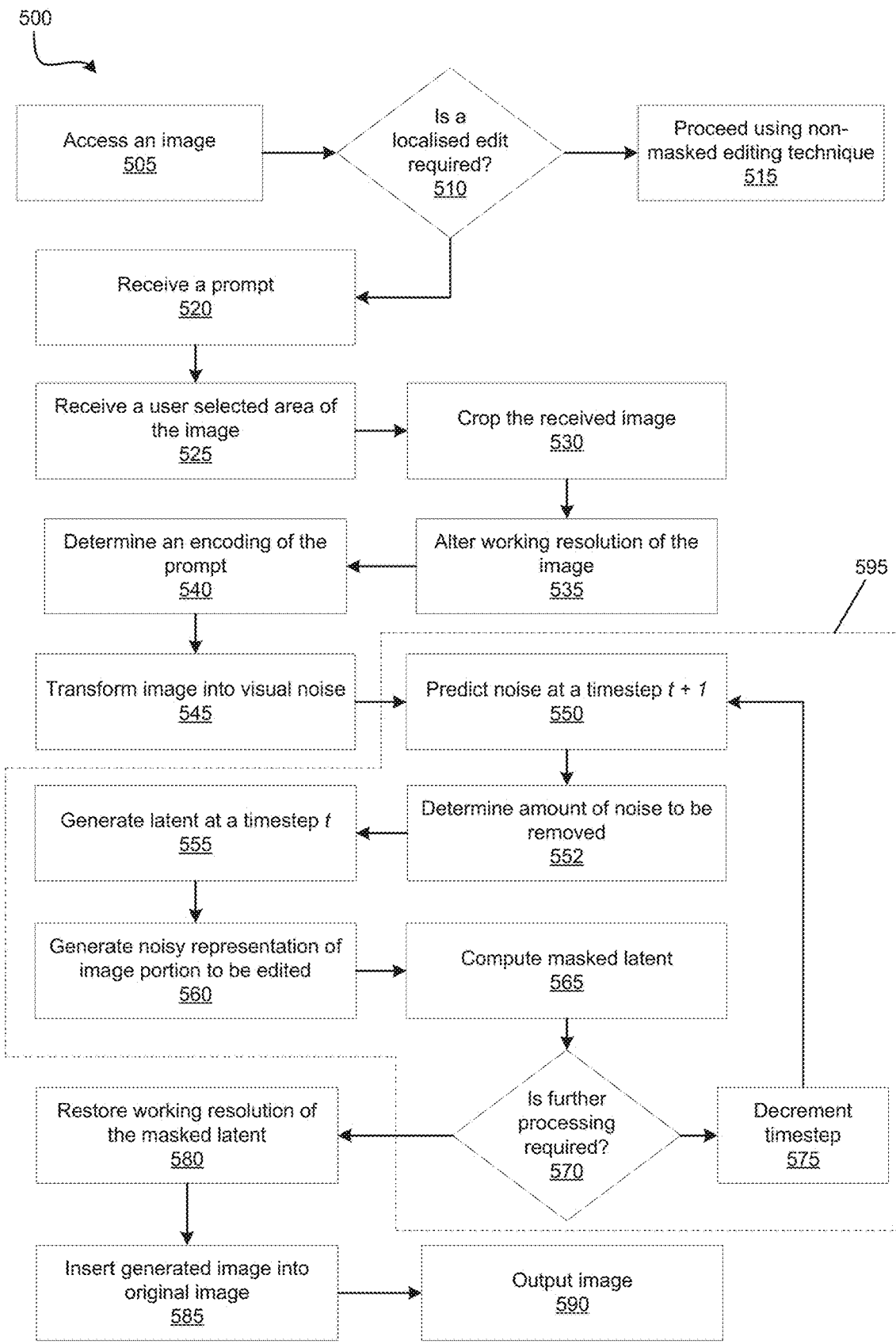
FIG. 5 is a process flow diagram of a method of performing prompt-based image editing using the system of FIG. 4, according to some embodiments.

FIG. 5 is a process flow diagram of a method 500 of performing prompt-based image editing according to some embodiments. In some embodiments, method 500 may be performed at least partially by processor 411 executing image editing application 415. In some embodiments, method 500 may be performed at least partially by processor 421 executing server application 433. While certain steps of method 500 have been described as being executed by particular elements of system 400, these steps may be performed by different elements in some embodiments. Furthermore, while the steps of method 500 have been illustrated and described as occurring in a particular order, some of the steps may be performed in an alternative order without affecting the outcome of the method.

At step 505, processor 421 executing server application 433 accesses an image for editing. This image will be referred to as the "original image". In some embodiments, the original image may be a user-selected image. The accessing may be from a memory location, from a user I/O, or from an external device in some embodiments. For example, processor 421 may access the original image from image data 430 in some embodiments.

In some embodiments, the original image may be sent to server system 420 from user computing device 410. This may be in response to a user of user computing device 410 using a camera forming part of the user I/O 416 to capture an image for editing, or by the user selecting an image from a memory location. The memory location may be in memory 412 stored locally on user computing device 410, or in the data 423 in memory 422 stored remotely in server system 420. Depending on where the image editing processes are to be performed, a copy of the original image may be stored to a second memory location to allow for efficient access of the image file by processor 411 and/or processor 421. For example, a copy of the original image may be stored in image data 430 of memory 422 for access by processor 421.

According to some embodiments, the original image may be displayed within a user interface of the image editing application 415, which may be displayed on a display screen (not shown) forming part of the user I/O 416.

Example images that may be received at step 505 are shown in FIGS. 1A, 1C, 2A, and/or 3A, as described above, and in FIG. 6A, 8A, 9A or and/or 10A, as described in further detail below.

At step 510, processor 421 executing server application 433 determines whether the user has elected to perform a localised edit of the original image. In other words, processor 421 determines whether the user is trying to edit the original image received at step 505 as a whole, or is trying to edit a specific area, object, element or portion of the original image. In some embodiments, this may be determined by receiving a user input from user I/O 416 indicating whether edit is to be a localised edit. Image editing application 415 may be caused to present a user interface element to allow a user to provide such an indication. The user interface element may be a check box, radio button, drop-down box, virtual button, or other user interface element that allows a user to make a selection or enter data to indicate whether or not they wish to make a localised edit of the original image received at step 505.

In some other embodiments, a localised edit may be the default option, and processor 421 may proceed to step 520 without needing to make any determination at step 510.

In some embodiments, step 510 may be performed after either or both of steps 520 and 525, and the data received from steps 520 and/or 525 may be used by processor 421 to determine whether a localised edit is required. This is described below with reference to each of these steps.

If processor 421 determines at step 510 that a localised edit is not required or not intended by the user, then processor 421 executing server application 433 may proceed to perform a non-masked editing technique to perform any edits to the original image received at step 505. For example, processor 421 may proceed to make any edits using the automated editing techniques described in Brooks et al.

If processor 421 determines at step 510 that a localised edit is required, processor 421 proceeds to step 520. At step 520, processor 421 executing server application 433 receives a user input corresponding to a prompt relating to the edit that the user wishes to perform to the original image accessed at step 505. The prompt may be indicative of an editing instruction or comprise an editing instruction. In some embodiments, the prompt may be a text prompt, an audio recording, a selection from a list, or any other suitable type of prompt. When the prompt is a text prompt, the prompt may be entered using a text input field, such as a text box. When the prompt is an audio recording, the audio recording may be in the form of an .MP3 or .WAV, or any other suitable audio file format.

Where step 510 is performed after step 520, processor 421 may use the content of the prompt received at step 520 to determine whether the user intends to make a localised or global edit to the original image. For example, processor 421 may determine whether the prompt includes reference to a specific area, object, element or portion of the original image received at step 505.

At step 525, processor 421 executing server application 433 receives a user input corresponding to a selection of the area of the original image that they would like to edit, referred to as the selected area or the user selected area. According to some embodiments, a user wishing to edit the original image may interact with a user I/O 416 of computing device 410 displaying the original image to indicate which area of the original image they wish to edit. For example, the user may use a brush tool, trace tool, or other tool to digitally select, trace, circle, or "paint" over the element to be edited via the user I/O 416 to produce a user selected area, which can be used to perform an editing method as described in further detail below with references to steps 530, 565 and 585. The user selected area may be stored in user selected area data 432.

In some cases, the user selected area may be used to generate image data representing a mask defined by the user selected area. For example, a binary mask may be generated, where a first pixel value may represent areas of the image falling within the user selected area and a second pixel value different to the first pixel value may be used to represent areas falling outside of the user selected area. In some embodiments, white pixels may represent the user selected area, being the area selected for editing, and black pixels may represent areas outside the user selected area where no editing it to be performed. The generated image data representing a mask may be stored to user selected area data 432.

Some example images showing a user selected area that may be received at step 525 are shown in FIGS. 6C, 7B, 8B, 9B and 10B, as described in further detail below.

Where step 510 is performed after step 525, processor 421 may use the user selected area received at step 525 to determine whether the user intends to make a localised or global edit to the original image. For example, processor 421 may determine whether the user selected area includes only a specific area, object, element or portion of the original image received at step 505, or whether the user area includes substantially the whole area of the original image received at step 505.

In some embodiments, steps 520 and 525 may be performed in the opposite order, with the user selected area being received before the prompt.

At optional step 530, processor 421 executing cropping module 435 may crop the image accessed at step 515 to generate a cropped image. The cropped image may be stored to image data 430 for further processing. Performing a cropping step may improve the quality of resulting edited image. The cropped area may be rectangular. According to some embodiments, the borders of the cropped area may be parallel to the borders of the accessed image. The cropped area may comprise the user selected area and at least one non-selected region. For example, where the cropped area is rectangular, the non-selected region may be the region or regions defined by the border of the user selected area and the border of the rectangle.

Cropping the image may improve the quality and resolution of the edited image element, as the relative size of the image element within the image may be increased. This is particularly true where the resolution of the image being processed is adjusted to a working resolution, as described below with reference to step 535. Where a smaller image is being processed at a set working resolution, the pixel density of the image can be increased and a larger the number of pixels can be allocated to the image element being edited.

Processor 421 executing cropping module 435 may, in some embodiments, determine a minimum cropped area that entirely encompasses the user selected area. The minimum cropped area may be the smallest rectangle that entirely encompasses the user selected area and that has borders parallel to the borders of the accessed image. In some embodiments, processor 421 executing cropping module 435 may determine a buffer area around the user selected area and/or minimum cropped area to create the cropped area. In some cases, the buffer area may be set to zero, such that the cropped image is the minimum cropped area.

The buffer area may be an additional zone around the minimum cropped area. The buffer area may be determined based on the total area of the minimum cropped area and/or user selected area. For example, the buffer area may be an additional area that is between 1% and 50% of the size of the minimum cropped area and/or user selected area. The buffer area may be an additional area that is between 5% and 30% of the size of the minimum cropped area. The buffer area may be an additional area that is between 10% and 20% of the size of the minimum cropped area. The buffer area may be an additional area that is approximately 15% of the size of the minimum cropped area. The cropped image may therefore comprise the minimum cropped area around the user selected area, and an additional buffer area.

Where the original image received at step 505 is cropped as described above, the image data defining the user selected area as generated at step 525 and stored as user selected area data 432 may also be cropped using the same boundary coordinates.

At optional step 535, processor 421 executing resolution adjustment module 436 may adjust the resolution of the image being edited to a working resolution. This may be the original image received at step 505 or the cropped image generated at step 530, if a cropping step was performed. According to some embodiments, the working resolution may be between 448×448 pixels and 640×640 pixels. Where image being processed is not a square, the working resolution may have the same number of pixels as a 448×448 to 640×640 square of pixels. According to some embodiments, the number of pixels in the image may be adjusted to a multiple of 32. In some embodiments, changing the working resolution of the image may comprise generating a latent mapping of the pixel information of the image, or the mapping of the pixel information to latent space. This may allow for faster or more efficient processing of the image. According to some embodiments, the compression of the image may be performed using an encoder.

The resulting image from the last of steps 505, 530 or 535 to be performed may be considered the "image portion to be edited".

At step 540, processor 421 executing encoding module 434 is caused to determine an encoding or embedding of the prompt received at step 520. The encoding may be a representation, such as a numerical representation, of the prompt. The encoding or embedding may be generated by first tokenising the prompt, and then using the tokens to generate the encoding. In some embodiments, when the prompt is a text prompt, the encoding module 434 may use a text encoder to determine, from the prompt, a numerical value and/or set/series of numerical values that are indicative of the meaning or content of the prompt. The encoding module 434 may use any suitable text encoder/texting encoding process, such as frequency document vectorization, one-hot encoding, index-based encoding, word embedding, or contrastive language-image pre-training (CLIP) to determine the encoding. In some embodiments encoding module may use a CLIP ViT-L/14 text encoder to determine the encoding of the prompt.

In some embodiments, when the prompt is an audio file, processor 421 executing encoding module 434 may be caused to determine a textual representation of the audio recording before performing the encoding step. The textual representation of the audio recording may be determined using a speech to text ML model, such as Google speech-to-Text, DeepSpeech, Kaldi, or Wav2Letter, or any other suitable speech to text ML model.

According to some embodiments, step 540 may be performed at any point after a prompt is received at step 520 and before the denoising loop 595 begins at step 550.

At step 545, processor 421 executing visual noise module 437 is caused to generate visual noise based on the image portion to be edited, to generate a latent. This may be referred to as the "original latent image". The visual noise may be generated by adding randomly generated visual noise to the image portion to be edited. In some embodiments, the noise may be Gaussian noise. In some embodiments, the visual noise is generated by replacing the pixel information of the image portion to be edited completely with visual noise. In other words, the entire set of pixel information or latent mapping of the pixel information may be deleted and replaced with pure visual noise, such that the image portion to be generated is transformed into visual noise. Where a noise strength parameter defines the amount of noise to be added, this may be done by setting the noise strength parameter to 1.0. In some alternative embodiments, a noisy image that is not pure noise may be produced. This may be done by adding less noise to the image, or using a noise strength parameter of less than 1.0. This may allow some visual features of the image to be retained, so that the editing process retains more of the original features of the image.

Visual noise may refer to a variance, such as a random variance, in the attributes/qualities of the pixel information or a latent mapping of the pixel information of a digital image. The attributes of the pixel information or a latent mapping of the pixel information of a digital image may be brightness, colour (e.g. colour model), dimension, bit depth, hue, chroma (saturation), and/or value (lightness). The visual noise may comprise a plurality of pixels that have had their information randomly altered/varied. In some embodiments, the visual noise may be Gaussian noise, which is a type of signal noise that has a probability density function equal to that of the normal distribution (also known as the Gaussian distribution). In some embodiments, the Gaussian visual noise may be white Gaussian noise, in which the values at any pair of times are identically distributed and statistically independent (and hence uncorrelated). According to some embodiments, noise may be added multiple times at a relatively low standard deviation.

Steps 550 to 575 of method 500 comprise a denoising loop 595, in which a backwards diffusion process is used to transform the original latent image generated at step 545 into an edited image based on the prompt received at step 520 through a series of predictions generated by a ML model. Each pass through the loop comprises a timestep in the denoising process, which is considered a backwards step in reference to a time t. The denoising is a backwards or reverse process compared to a forwards noising process that is performed during training of the ML model, as described in further detail below with reference to FIG. 11.

The steps performed during the denoising loop 595 described below with reference to steps 550 to 575 enhance the image editing process by reducing the effect of the editing process outside of the image elements selected for editing by the user. Specifically, the steps are configured to confine any edits to the user selected area of the original image, without affecting the unselected elements of the image. This reduces undesirable effects such as the leaking of colour outside of the element being edited, as shown in FIGS. 2C and 3C.

Immediately prior to the start of the denoising loop can be considered to be at a timestep t+1, where the latent at timestep t+1 is the original latent image, being the visual noise generated at step 545. As the denoising loop is a backwards process, each iteration of the loop concludes with the timestep moving backwards, so that t=t−1. In other words, adding to the timestep results in increased noise, while reducing the timestep results in decreased noise. The start of the denoising loop therefore occurs at a timestep t.

At step 550, processor 421 executing denoising module 438 is caused to predict a noise image, being an image representing the amount of noise that is present in the latent at a timestep t+1. The noise image may be generated based on at least the latent and the prompt. In some embodiments, the noise image is generated with respect to the final image being generated based on the original image and the editing instruction provided by the prompt. The denoising module 421 has learned to predict a noise image during the training process, by learning to associate each timestep with the amount of noise present at that timestep based on the total noise that would have been added to the image at that time during the forwards noising process, as described below with reference to FIG. 11.

Processor 421 may perform this prediction step by providing the current latent, the image portion to be edited, and the prompt as encoded at step 540 to an image editing model trained to perform a denoising step, such as the ML model described in Brooks et al. In some embodiments, this may be a ML model trained as described below with reference to FIG. 11.

At step 552, processor 421 executing denoising module 438 is caused to determine the amount of noise to be removed from the latent at the current timestep t based on a noise schedule. The noise schedule may define how much noise is to be removed at each timestep, and may be based on a noise schedule which was used to train the ML model during the forwards noising process. In some embodiments, more noise may be removed during the initial, higher timesteps, and less noise may be removed during the later, lower timesteps.

At step 555, processor 421 executing denoising module 438 is caused to generate the updated latent for a current timestep t. This is generated based on the noise image predicted at step 550, the noise amount determined at step 552, and the previous latent at timestep t+1. Specifically, the updated latent at timestep t is calculated by subtracting at least a portion of the noise image from the previous latent. According to some embodiments, the updated latent is generated by multiplying the noise image calculated at step 550 with the amount of noise determined at step 552, and subtracting the result from the previous latent at timestep t+1. The latent at timestep t+1 may be the original latent image during a first iteration of denoising loop 595, or the latent from the previous iteration of the denoising loop 595. Due to the subtraction of noise, the updated latent at timestep t is less noisy than the previous latent at timestep t+1.

At step 560, processor 421 executing denoising module 438 is caused to generate a noisy representation of the image portion to be edited based on the current timestep, being timestep t. The noisy representation is computed by adding a random noise to the image portion to be edited. The strength of the added noise is controlled by a variance parameter, and is dependent on the current timestep t. Specifically, a higher value of timestep t results in more noise being added to the noisy representation. The variance parameter is a parameter of the noise function, where high variance means more noise and less variance means less noise. This variance depends on the timestep t, so that a higher t means a higher variance, which results in more noise added to the image portion.

At step 565, processor 421 executing denoising module 438 is caused to compute a masked latent based on the updated latent at timestep t generated at step 555, the noisy representation at time t generated at step 560, and user selected area received at step 525. Specifically, a binary mask defining the user selected area is retrieved from user selected area data 432. The masked latent at timestep t is computed as:

$$\text{masked\_latent}(t) = \text{mask} * \text{latent}(t) + (1 - \text{mask}) * \text{noisy\_representation}(t)$$

where:
mask is the binary mask representing the user selected area retrieved from user selected area data 432;
latent (t) is the updated latent at timestep t generated at step 555; and
noisy_representation(t) is the noisy representation at timestep t generated at step 560. Using a masked latent as per the above equation constrains the editing of the original image to be localized within the user selected or masked area. Outside the masked area, the original image data from the image portion to be edited is passed through unedited. Thus, mask*latent(t) represents the area of the image portion where the editing is to occur, which is guided by the input instruction prompt, and (1−mask)*noisy_representation(t) represents the complementary area which is to remain similar to the original image. This prevents spilling of edits to the image, such as changes in colour, outside of the image element to be edited. Example images with and without this step are described in further detail below with reference to FIGS. 6D, 8C and 9C

At step 570, processor 421 executing denoising module 438 is caused to determine whether further processing is required. According to some embodiments, denoising module 438 may be configured to perform a predetermined number of denoising cycles or iterations through denoising loop 595, and so step 570 may comprise comparing the number of denoising cycles that have been performed with the predetermined number of denoising cycles that are to be performed. According to some embodiments, between 15 and 40 denoising cycles may be performed. In some embodiments, between 20 and 30 denoising cycles may be performed. For example, around 20, 25 or 30 denoising cycles may be performed.

If processor 421 determines that further denoising steps are to be performed, then processor 421 proceeds to perform step 575. At step 575, processor 421 executing denoising module 438 is caused to start a new denoising loop by decrementing the timestep. This may be by setting the timestep t as t−1, for example.

If processor 421 determines that no further denoising steps are to be performed, then processor 421 proceeds to perform step 580. The last masked latent determined at step 565 can be considered the edited image portion.

At step 580, where the working resolution of the image being processed was adjusted at step 535, processor 421 executing resolution adjustment module 436 is caused to restore the resolution of the edited image portion to be equivalent to the resolution of the original image accessed at step 505. This may be performed using a decoder that is configured to decompress or reconstruct the image to restore a pixel representation of the image based on the latent representation. If the working resolution was not adjusted at step 535, processor 421 may skip step 580.

At step 585, where the image being processed was cropped at step 530, processor 421 executing image combining module 439 may insert at least part of the edited image portion into the area of the original image received at step 505 that corresponds with the cropped area or the user selected area, to create an output image. In some embodiments, only the area of the edited image portion that corresponds with the user selected area may be inserted back into the original image. In other embodiments, the whole edited image portion may be inserted back into the original image.

In some embodiments, at step 585, processor 421 executing image combining module 439 may be caused to meld the pixel information of the edited image portion with the original image, such that the edited image portion naturally, and/or substantially unnoticeably with the original image. This may be necessary as some pixel information outside of the edited image element may have been inadvertently edited or distorted during the editing process. FIGS. 10A to 10D, as described in further detail below, illustrated a process of melding pixel information that may be performed by processed 421 at step 585. The result of the melding process may be considered the final edited image.

At step 590, processor 421 executing server application 433 is caused to output the final edited image. This may be by one or more of saving the image to memory 412, memory 422 or an external memory location; by sending the image to an external device for storage or display, and/or by displaying the image via user I/O 416 of user computing device 410.

Figure 6A:
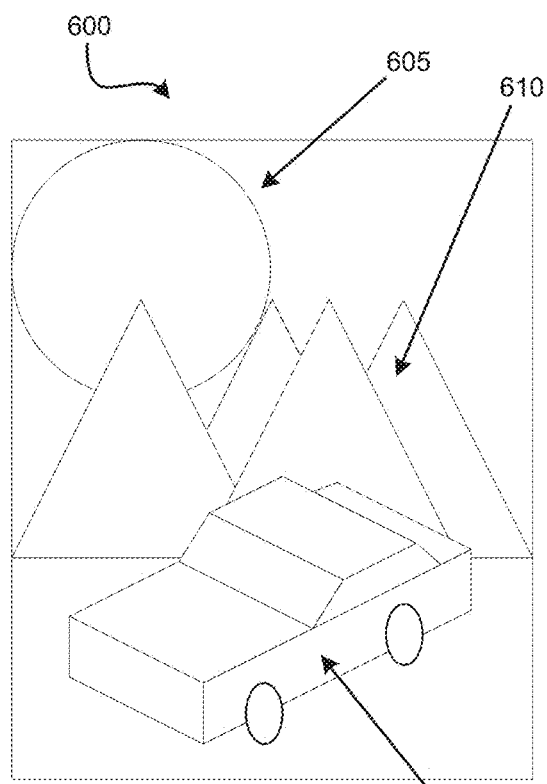
FIGS. 6A to 6D are a set of example diagrams that show the results of localised prompt-based image editing, according to some known methods.
Figure 6B:
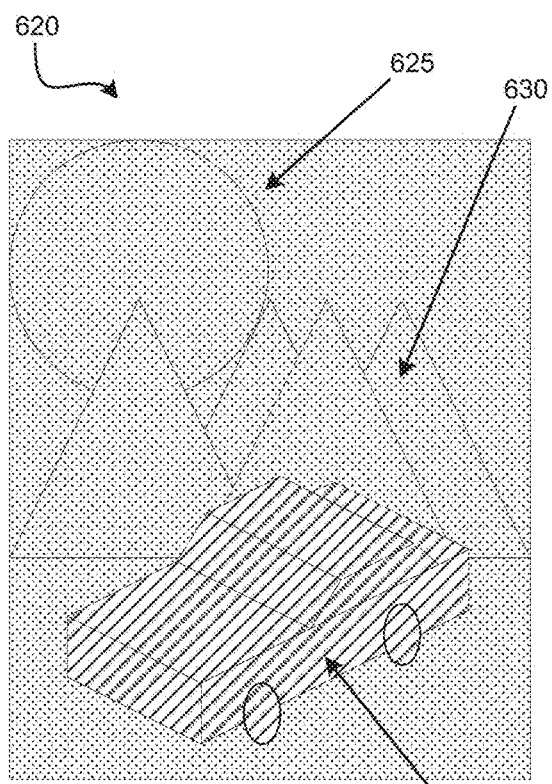

FIGS. 6A and 6B are diagrammatical representations of the stages of performing previously known methods of automatic image editing on an image.

FIG. 6A shows an example original image 600. Image 600 includes a background 605 including mountains 610, and a foreground element being a car 615. Image 600 may be an image selected or uploaded by a user for editing using an image editing application.

FIG. 6B shows an example edited image 620. Image 620 is an edited version of image 600, and has been generated using a prompt-based image editing technique performed by an image editing application according to some known techniques with the supplied prompt "Make the car darker". For example, image 620 may have been generated using a diffusion machine learning (ML) model, which is a neural network model trained or otherwise configured to de-noise images containing Gaussian noise by learning to reverse the diffusion process. Image 620 may have been generated using the techniques as described in Brooks et al.

However, the editing of image 600 to generate image 620 has produced some undesirable results. Image 620 shows a background 625 including mountains 630, and a car 635. In accordance with the supplied prompt, car 635 has been rendered a darker colour compared to car 615. However, the remaining elements of image 620 have also been altered. The background 625 including mountains 630 have become significantly darker compared to background 605 and mountains 610 of FIG. 6A. In other words, the edits made to car 615/635 have not been contained to that image element, but have been applied to the image 600/620 as a whole.

Figure 6C:
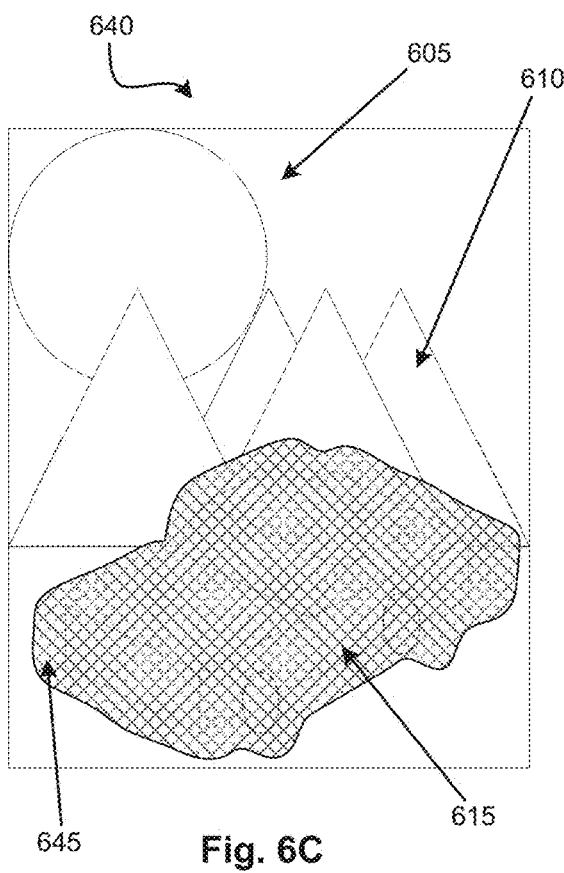
Figure 6D:
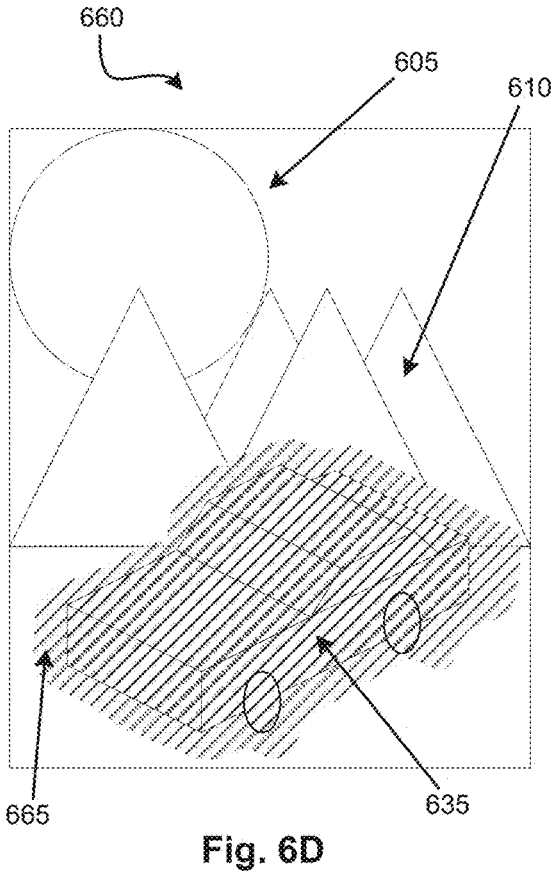

FIGS. 6C and 6D are diagrammatical representations of the stages of performing a partially-masked editing process on an image. Specifically, FIGS. 6C and 6D relate to a method similar to method 500, but in which at least steps 560 and 565 are omitted.

FIG. 6C shows an example masked image 640. Image 640 includes the background 605 including mountains 610, and car 615 of FIG. 6A. Image 640 further comprises a user selected area 645 indicating the area of the image the user wishes to edit.

FIG. 6D shows an example edited image 660. Image 660 is an edited version of image 600, and has been generated using a partially-masked editing process as described above, with the supplied prompt "Make the car darker". For example, image 620 may have been generated using a diffusion machine learning (ML) model.

In this case, image 660 shows a background 605 including mountains 610 which have been substantially unedited. In accordance with the supplied prompt, image 660 includes car 635 which has been rendered a darker colour compared to car 615. However, the area 665 around car 635 corresponding to the user selected area 645 of FIG. 6C has also been altered, and is darker than the corresponding area of image 600. While the changes have been confined to the user selected area 645, they have not been confined to the image element identified for editing, being the car.

FIGS. 7A to 7K are diagrammatical representations of some of the stages of performing a prompt-based image editing method 500 as described above with reference to FIG. 5. As shown in the images, performing method 500 may increase the degree to which edits to an image are confined to a specific image element when compared to the methods illustrated in images 6A to 6D.

Figure 7A:
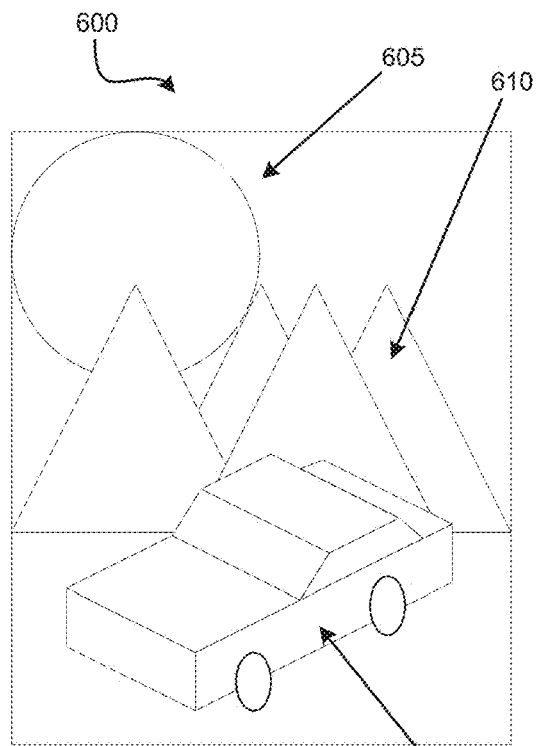
FIGS. 7A to 7K are example diagrams showing the steps and results of performing the method of FIG. 5, according to some embodiments.

FIG. 7A shows an example original image 600, which is the same as the image shown in FIG. 6A. Image 600 includes a background 605 including mountains 610, and a foreground element being a car 615. Image 600 may be an image accessed for editing at step 505 of method 500, and stored to image data 430.

A prompt (not shown) may be received from the user at step 520 of method 500 and stored in prompt data 431. For the example illustrated in FIGS. 7A to 7K, the example prompt received was "Make the car darker".

Figure 7B:
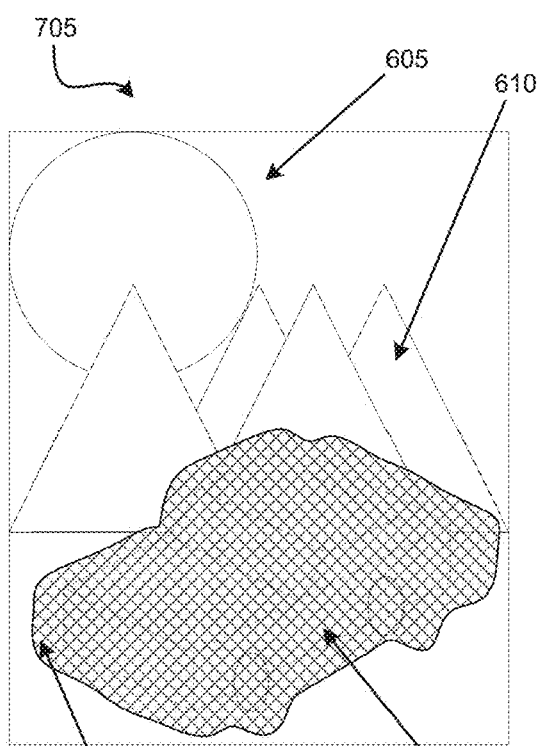
Figure 7C:
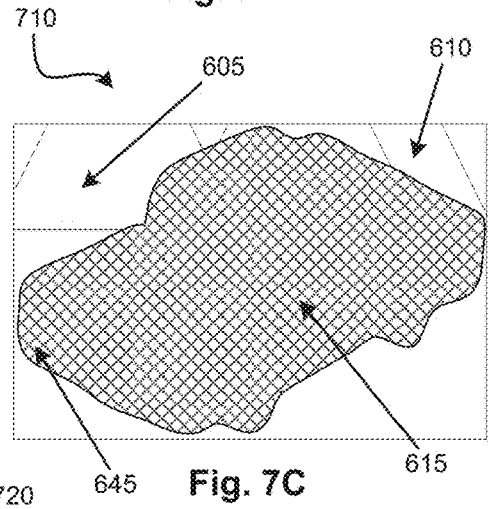
Figure 7D:
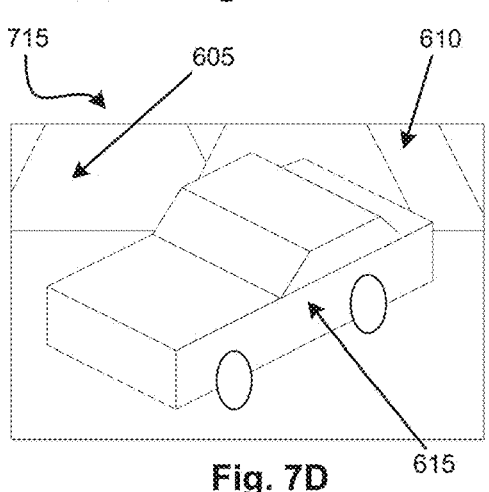

FIG. 7B shows an example masked image 705. Image 705 includes the background 605 including mountains 610, and car 615 of FIG. 7A. Image 705 further comprises a user selected area 645 indicating the area of the image the user wishes to edit. User selected area 645 may be received at step 525 of method 500, and stored in user selected area data 432.

FIG. 7C shows a cropped masked image 710. Portions of background 605 and mountains 610 are visible in cropped masked image 710, but these have been partially cropped. The entirety of car 615 and user selected area 645 have been retained in image 710. Image 710 is a version of image 705 that has been tightly cropped around user selected area 645. Image 710 may be generated by cropping module 435 at step 530 of method 500, and may be used to define the binary mask used at step 565.

FIG. 7D shows a cropped image 715. Portions of background 605 and mountains 610 are visible in cropped masked image 715, but these have been partially cropped. The entirety of car 615 has been retained in image 710. Image 715 is a version of image 600 that has been tightly cropped around user selected area 645. In other words, image 715 is a version of image 710 in which the user selected area has been removed. Image 710 may be generated by cropping module 435 at step 530 of method 500, and may be used to generate an edited version of car 615.

Figure 7E:
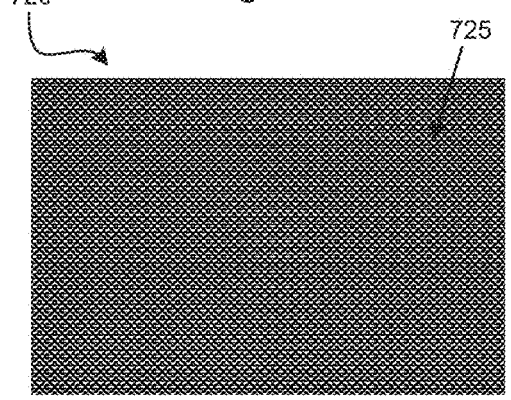

FIG. 7E shows a latent image 720. Image 720 comprises visual noise 725, which may be Gaussian noise. Image 720 may be generated by visual noise module 437 at step 545 of method 500.

Figure 7F:
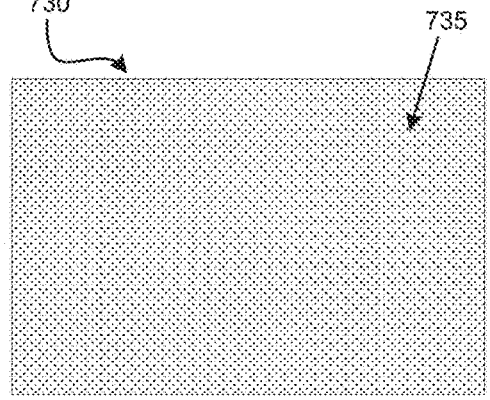

FIG. 7F shows a noise image estimate 730. Noise image estimate 730 comprises visual noise 735, which is a prediction of the amount of noise added to latent image 720 at a timestep t+1. Noise estimate 730 may be generated by denoising module 438 during step 550 of method 500.

Figure 7G:
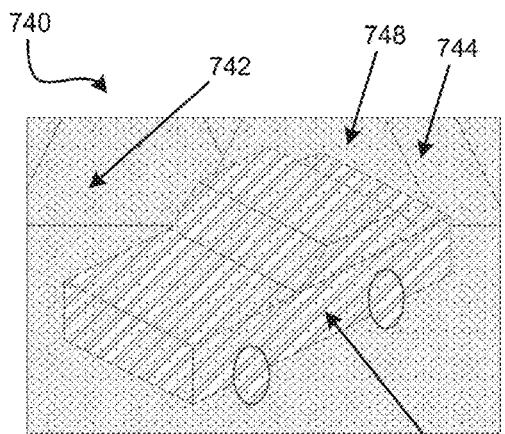

FIG. 7G shows an updated latent image 740. Updated latent image 740 shows a generated background 742 including mountains 744, and car 746. Updated latent image 740 still contains an amount of visual noise 748. Updated latent image 740 may be generated by denoising module 438 during step 555 of method 500, by subtracting the noise image estimate 730 from the latent image 720. By doing so, image elements 742, 744 and 746 start to emerge or be generated from the noise, with the edits according to the prompt applied. Specifically, the car 746 is darker than the car 615. However, the background 742 and mountains 744 are also darker than background 605 and mountains 610.

Figure 7H:
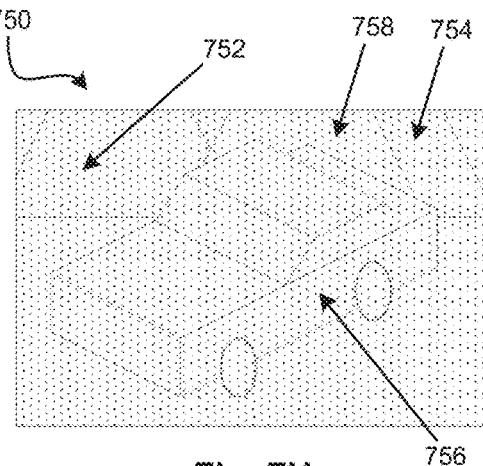

FIG. 7H shows a noisy representation 750. Noisy representation 750 shows a background 752 including mountains 754, and a car 756. Noisy representation 750 is a version of cropped image 715 with noise 758 applied. In other words, background 752, mountains 754, and a car 756 are simply background 605, mountains 610, and a car 615 with added noise 758. Noise 758 may be calculated by denoising module 438 during step 560 based on the current timestep t, and applied to the cropped image 715 to produce noisy representation 750.

Figure 7I:
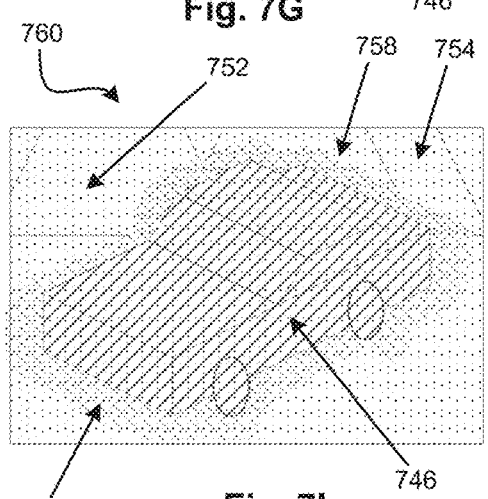

FIG. 7I shows a masked latent image 760. Masked latent image 760 shows background 752 and mountains 754 being substantially identical as those in noisy representation 750, including noise 758. Masked latent image 760 further shows car 746 and area 762 around car 746 which are substantially identical to those in updated latent image 740. Masked latent image 760 may be generated by denoising module 438 during step 565 of method 500, during which the updated latent image 740 is combined with the noisy representation 750 based on the user selected area 645. In other words, the areas of updated latent image 740 corresponding with the user selected area 645 are combined with the areas of noisy representation 750 that are outside of the user selected area 645.

Masked latent image 760 may be reprocessed by iteratively following steps 550 to 565 until a predetermined stopping parameter is reached. For example, the predetermined stopping parameter may be a number of iterations. With each step, additional noise is removed, causing the edited image element to be constructed, while retaining the background features that are not to be edited.

Figure 7J:
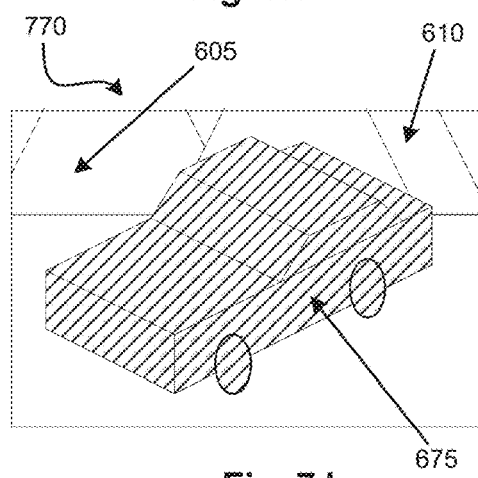

FIG. 7J shows an example final masked latent image 770, in which the background 605 including mountains 610 have been preserved, while car 675 has been edited to be darker than car 615. No "spilling" of the colour of car 675 is visible in the other image elements.

Figure 7K:
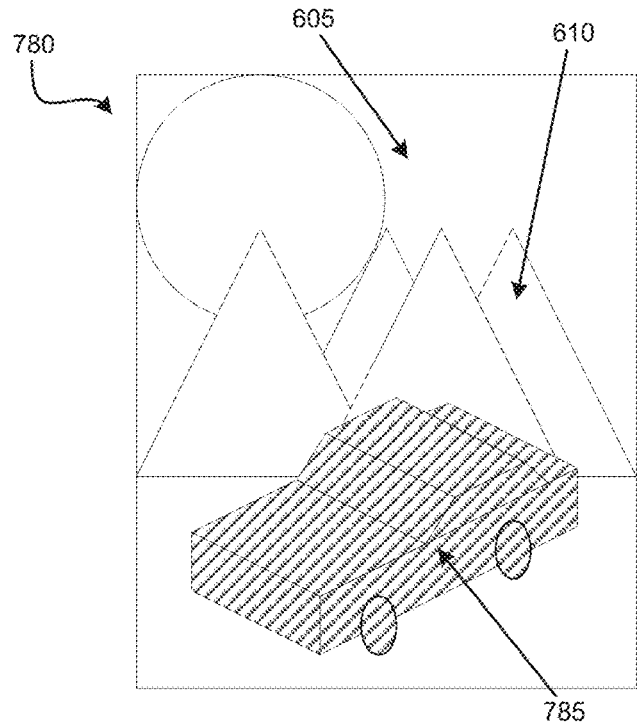

FIG. 7K shows a final image 780. Final image 780 may be generated during step 585 of method 500. Image 780 is the result of inserting final masked latent image 770 back into original image 600. This results in the full image showing the entirety of unedited background 605 including mountains 610, with edited car 675.

FIGS. 8A to 8D and 9A to 9D show some example images illustrating both the results of a partially masked editing method, and the prompt-based image editing method 500 as described above with reference to FIG. 5. As shown in the images, performing method 500 may increase the degree to which edits to an image are confined to a specific image element when compared to the partially masked method.

Figure 8A:
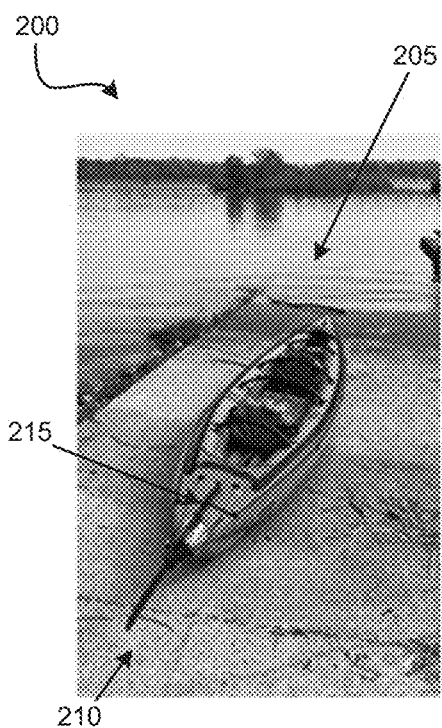
FIG. 8A to 8D are a first set of example images showing the results of performing the method of FIG. 5, according to some embodiments.

FIG. 8A shows an example original image 200 comprising a background 205 and a subject, being a kayak 215. In the illustrated example, the kayak is resting on a concrete landing 210. Kayak 215 has a red exterior, a grey interior, and some black details. Background 205 shows a body of water with green shrubs or trees in the distance, and a portion of sky visible above a horizon. Image 200 may be an image selected or uploaded by a user for editing using an image editing application. Image 200 is identical to image 200 of FIG. 2A.

Figure 8B:
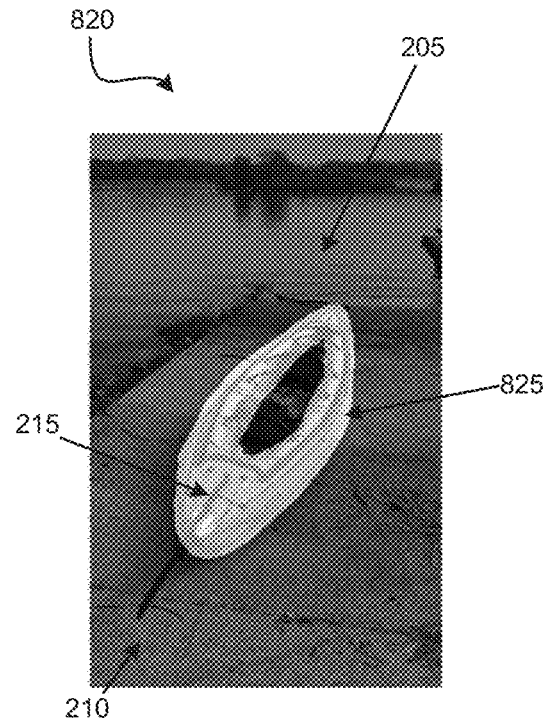

FIG. 8B shows an example masked image 820. Image 820 includes the background 205, landing 210 and kayak 215 of image 200. Image 820 further comprises a user selected area 825 indicating the area of the image the user wishes to edit.

Figure 8C:
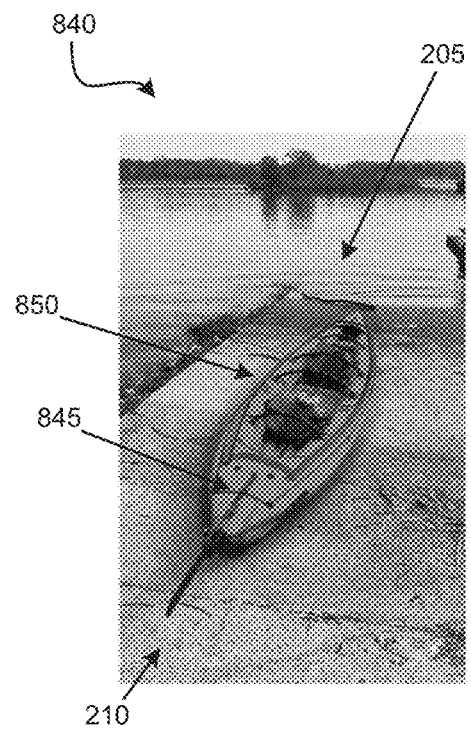

FIG. 8C shows an example edited image 840. Image 840 is an edited version of image 200, and has been generated using a partially-masked editing process as described above, with the supplied prompt "Make the boat green". For example, image 840 may have been generated using a diffusion machine learning (ML) model.

In this case, image 840 shows background 205 and landing 210 which have been substantially unedited. In accordance with the supplied prompt, image 840 includes kayak 845 which has been rendered a greener colour compared to kayak 215. However, the area 850 around kayak 845 corresponding to the user selected area 825 of image 820 has also been altered, and is greener than the corresponding area of image 200. While the changes have been confined to the user selected area 825, they have not been confined to the image element identified for editing, being the kayak 215/845.

Figure 8D:
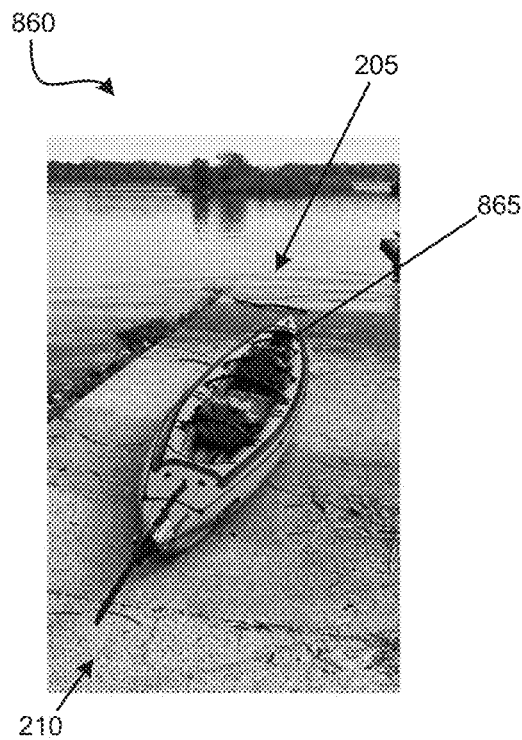

FIG. 8D shows a further example edited image 860. Image 860 is also an edited version of image 200, but has been generated using method 500, as described above with reference to FIG. 5. Image 860 shows that using method 500, background 205 and landing 210 have been preserved, while kayak 865 has been edited to be greener than kayak 215. No "spilling" of the colour of kayak 865 is visible in the other image elements.

FIG. 9A shows an example original image 300 comprising a background 305 and a subject, being an apple 315. In the illustrated example, the apple is red in colour and is resting on a white lace tablecloth that forms the background 305. Other food items are resting on the tablecloth, such as sushki 310. Image 300 may be an image selected or uploaded by a user for editing using an image editing application. Image 300 is identical to image 300 of FIG. 3A.

FIG. 9B shows an example masked image 920. Image 920 includes the background 305, food items 310 and apple 315 of image 300. Image 920 further comprises a user selected area 925 indicating the area of the image the user wishes to edit.

FIG. 9C shows an example edited image 940. Image 940 is an edited version of image 300, and has been generated using a partially-masked editing process as described above, with the supplied prompt "Make the apple golden". For example, image 940 may have been generated using a diffusion machine learning (ML) model.

In this case, image 940 shows background 305 and food items 310 which have been substantially unedited. In accordance with the supplied prompt, image 840 includes apple 945 which has been rendered a yellower colour compared to apple 315. However, the area 950 around apple 945 corresponding to the user selected area 925 of image 920 has also been altered, and is yellower than the corresponding area of image 300. While the changes have been confined to the user selected area 925, they have not been confined to the image element identified for editing, being the apple 315/945.

FIG. 9D shows a further example edited image 960. Image 960 is also an edited version of image 300, but has been generated using method 500, as described above with reference to FIG. 5. Image 960 shows that using method 500, background 305 and food items 310 have been preserved, while apple 965 has been edited to be more yellow or gold than apple 315. No "spilling" of the colour of apple 965 is visible in the other image elements.

FIGS. 8D and 9D demonstrate some of the advantages of the described systems and methods.

FIG. 10A to 10D are example images depicting the melding of the pixel information of an edited portion of an image with the original image, as described above with reference to step 585 of method 500. As can be seen from FIGS. 10A to 10D and the description below, the pixel information of the edited image portion may be altered such that the pixel information of the edited image portion is more similar and/or substantially identical to the pixel information of the original image.

FIG. 10A is an example original image 1000 showing a background 1002 and a foreground element 1004, which is a spaceship in the illustrated embodiment. The spaceship is shown on a region of pinkish sky.

FIG. 10B is an example image 1010 which also shows background 1002 and foreground element 1004. Image 1010 also includes a user selected area 1006. User selected area 1006 may be an area selected by the user where image editing is to take place.

FIG. 10C is an example edited image 1020 that has been generated by a diffusion process, by a diffusion based ML model, such as by following the steps of method 500. Image 1020 has been generated based on the prompt "Make the spaceship pink". Image 1020 includes background 1002, and a new foreground element 1022 which is an edited version of foreground element 1004. Specifically, edited foreground element 1022 is pinker in colour than original foreground element 1004. However, image 1020 also comprises non-matching area 1024. Non-matching area 1024 is an area that surrounds the foreground element 1022 that clearly does not match in colour to the rest of image 1020. This may be due to unintentional editing of the pixels of non-matching area 1024 during the editing of foreground element 1022.

FIG. 10D is an example image 1030 in which a pixel melding process has been performed to remove non-matching area 1024. Image 1040 includes background 1002, and new foreground element 1022. Furthermore, the area 1034 around foreground element 1022 matches with the background 1002, such that example image 1030 does not include non-matching area 1024.

To perform the melding process, processor 421 executing image combining module 439 may transform non-matching area 1024 into a matching area 1034 by adjusting the values of pixel information of the area corresponding to user selected area 1006. This may be achieved by first determining the difference between the average value of the pixel information of the edited user selected area and the average value of the pixel information of the same area in the original image. The edited image can then be corrected by the determined difference. In some embodiments, the user-selected area may be feathered, blended or faded outwardly from the boundary of the user selected area, such that the edited image portion blends into the original image better.

Figure 11:
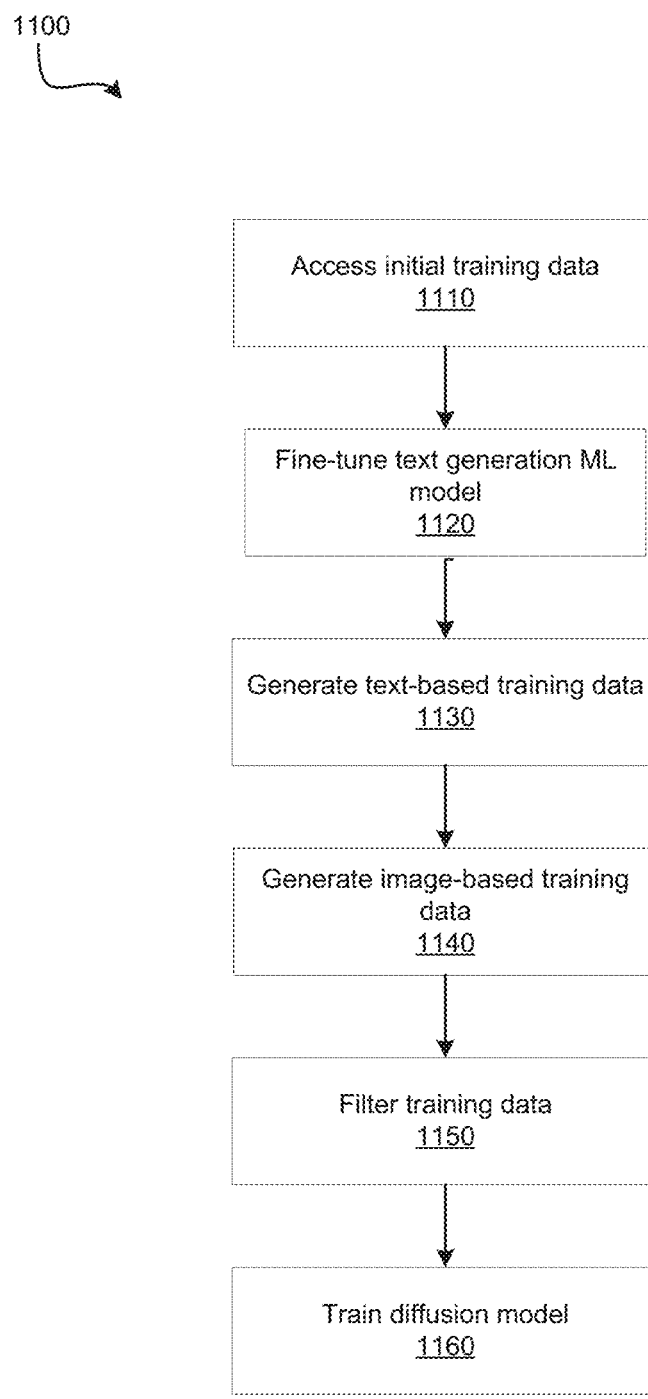
FIG. 11 is a process flow diagram of a method of training a machine learning model of perform prompt-based image editing using the system of FIG. 4, according to some embodiments.

FIG. 11 is a process flow diagram of a method 1100 of training an image editing model to perform an image editing process according to some embodiments. The image editing model may be a ML model, which may be a diffusion model. In some embodiments, method 1100 may be used to train an image editing ML model that performs a denoising process, such as denoising module 438. According to some embodiments, method 1100 may be performed at least partially by processor 421 executing server application 425. While certain steps of method 1100 have been described as being executed by particular elements of system 400, these steps may be performed by different elements in some embodiments. Furthermore, while the steps of method 1100 have been illustrated and described as occurring in a particular order, some of the steps may be performed in an alternative order without affecting the outcome of the method.

At step 1110, processor 421 executing server application 433 accesses initial training data to begin the training process. The initial training data may be retrieved from a memory location such as memory 422, received by communication interface 427 from an external device, or received from a user interface in some embodiments.

In some embodiments, the initial training data may comprise human-generated training data, which may be text based training data. According to some embodiments, the training data comprise a dataset of editing triplets, each comprising a caption of a first image, an editing instruction for performing an edit to the first image, and a caption of a second image being an edited version of the first image that has been edited based on the editing instruction. A selection of example triplets are provided in the table below:

| First image caption | Editing instruction | Second image caption |
| --- | --- | --- |
| Yefim Volkov, Misty Morning | make it afternoon | Yefim Volkov, Misty Afternoon |
| girl with horse at sunset | change the background to a city | girl with horse at sunset in front of city |
| photograph of a girl riding a horse | have her ride a dragon | photograph of a girl riding a dragon |
| Alex Hill, Original oil painting on canvas, Moonlight Bay | in the style of a coloring book | Alex Hill, Original coloring book illustration, Moonlight Bay |
| The great elf city of Rivendell, sitting atop a waterfall as cascades of water spill around it | Add a giant red dragon | The great elf city of Rivendell, sitting atop a waterfall as cascades of water spill around it with a giant red dragon flying overhead |
| Kate Hudson arriving at the Golden Globes 2015 | make her look like a zombie | Zombie Kate Hudson arriving at the Golden Globes 2015 |

According to some embodiments, between 500 and 1000 triplets may be accessed.

At step 1120, processor 421 executing server application 433 uses the training data received at step 1110 to fine-tune a text prompt generation model to perform text prompt generation. The text prompt generation model may be an ML model, which may be a Large Language Model (LLM), such as the GPT-3 Davinci model, for example. The text prompt generation model may be trained using a single epoch of the training data accessed at step 1110, and default training parameters may be used in some embodiments.

At step 1130, processor 421 executing server application 433 uses the text prompt generation model fine-tuned at step 1120 to generate a large collection of text-based training data in the form of triplets as described above. Specifically, the text prompt generation model is supplied a dataset of first image captions, and used to generate corresponding image editing instructions and second image captions for an image edited based on the editing instructions. According the some embodiments, the image captions used as input may be retrieved from a dataset of image captions, such as from the LAION-Aesthetics dataset. In some embodiments, between 400,000 and 500,000 triplets of training data may be generated.

At step 1140, processor 421 executing server application 433 uses the text-based training data generated at step 1130 to generate a collection of image-based training data. This may be done using an image generation model, which may be a ML model, and may be a diffusion ML model in some embodiments. For each triplet of training data, at least one image pair is generated. The image pair is generated using the first image caption and the second image caption for each triplet. In order to encourage the generated pair of images to be similar, a Prompt-to-Prompt method may be used. The Prompt-to-Prompt method encourages multiple generations from a text-to-image diffusion model to be similar. This is done through borrowed cross attention weights in some number of denoising steps. Specifically, Prompt-to-Prompt has as a parameter that can control the similarity between the two images, being the the fraction of denoising steps p with shared attention weights. According to some embodiments, processor 421 may be caused to generate a number of image pairs for each text triplet, with each image pair being generated with a different p. In some embodiments, the p value may be kept between 0.1 and 0.9. According to some embodiments, between 50 and 200 image pairs may be generated for each text triplet.

At step 1150, processor 421 executing server application 433 is caused to filter the images generated at step 1150, to ensure a degree of similarity between the two images and the editing instruction. This filtering may be performed using one or more CLIP based metrics, such as an image-image CLIP metric to ensure that the pairs of images are not too different; an image-caption CLOP metric to ensure the edited image corresponds with the editing instruction; and/or a directional similarity of the two images in CLIP space to ensure the before and after images match the before and after captions. According to some embodiments, an image-image CLIP threshold of between 0.6 and 0.9, between 0.7 and 0.8, or around 0.75 may be used. In some embodiments, an image-caption CLIP threshold of between 0.1 and 0.3, between 0.15 and 0.25 or around 0.2 may be used. In some embodiments, a directional CLIP similarity threshold of between 0.1 and 0.3, between 0.15 and 0.25 or around 0.2 may be used. Datasets that do not fall within one or more of the thresholds may be discarded. In some embodiments, the datasets may be sorted by a CLIP metric, and only a selection of the highest ranking datasets may be retained. For example, the datasets may be sorted based on the directional CLIP similarity, and only the top 4 images may be retained.

At step 1160, processor 421 executing server application 433 is caused to train an image editing model. The image editing model may be a ML diffusion model, which may be a conditional diffusion model. The image editing model may be supplied with a pair of images and a corresponding editing instruction retrieved from the training data. Starting with the first image, during a forward process the image editing model is caused to add noise to the image based on a noise schedule, with additional noise added at each timestep t so that the total noise present in the image increases over timesteps t. During a backwards process, the image editing model is supplied the editing instruction and then caused to remove noise incrementally in a way that generates the second edited image, again using the noise schedule to determine how much noise to remove. The actual noise added during the forward process can be compared to the predicted noise to determine a loss value, and the model may be configured to aim to minimise the loss value with each prediction. This results in a model that can predict the noise present in an image at any timestep t given the image and the editing instruction. The trained image editing model may be used as part of denoising module 438 to perform step 550 of method 500, as described above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of performing prompt-based image editing, the method comprising:
   accessing an image;
   receiving a selected area of the image;
   receiving a prompt, wherein the prompt is indicative of an editing instruction;
   generating a latent by transforming the image into visual noise;
   predicting, based on the latent and the prompt, a noise image corresponding to the latent;
   subtracting at least a portion of the noise image from the latent to generate an updated latent;
   generating a noisy representation of the image;
   generating a masked latent based on the noisy representation, the updated latent and selected area, wherein the masked latent comprises the updated latent in the areas corresponding to the selected area, and the noisy representation in the areas that do not correspond to the selected area.

2. The method of claim 1, further comprising repeating the steps of a denoising loop over a series of timesteps, wherein the denoising loop comprises the steps of predicting a noise image, generating an updated latent, generating a noisy representation and generating a masked latent.

3. The method of claim 2, wherein given a current timestep t, predicting the noise image comprises predicting the visual noise that would be present in the latent at a timestep t+1 during a noising process.

4. The method of claim 2, wherein generating the noisy representation of the first image comprises adding noise to the image based on the current timestep t.

5. The method of claim 2, wherein the timestep t is decremented after each iteration.

6. The method of claim 1, wherein the portion of the noise image to subtract from the latent is determined based on a noise schedule.

7. The method of claim 1, wherein the step of predicting the noise image is performed by a diffusion model, wherein the diffusion model is trained using sets of data comprising a first image, an editing instruction, and a second image edited based on the editing instruction.

8. The method of claim 7, wherein the diffusion model is trained by being caused to add noise to the first image with timesteps t increasing, then caused to remove noise by decrementing timesteps t to generate the second edited image.

9. The method of claim 1, further comprising determining an encoding of the received prompt, wherein the step of predicting a noise image is done using the encoding of the prompt.

10. The method of claim 1, further comprising cropping the accessed image based on the selected area.

11. The method of claim 1, further comprising altering the resolution of the accessed image to a working resolution before generating the latent, wherein the working resolution is a lower resolution that the resolution of the accessed image.

12. The method of claim 1, further comprising mapping pixel information corresponding to the accessed image to a latent space before generating the latent, such that the latent is a representation of the image in the latent space.

13. The method of claim 1, further comprising inserting the generated masked latent into the accessed image to produce an output image.

14. The method of claim 13, further comprising performing a pixel melding process on the generated masked latent to blend the generated masked latent with the accessed image.

15. The method of claim 14, further comprising outputting the image by saving the output image to a memory location, displaying the output image to a user, or sending the output image to an external device.

16. The method of claim 1, further comprising generating a binary mask based on the selected area, and using the binary mask to generate the masked latent.

17. The method of claim 1, wherein the masked latent is computed based on the equation $$masked\_latent = mask * latent + (1 - mask) * noisy\_representation,$$

where mask represents a mask generated based on the selected area, latent represents the updated latent, and noisy_representation represents the noisy representation.

18. The method of claim 1, further comprising receiving an indication that the prompt relates to a localised edit.

19. A non-transitory computer-readable storage medium storing instructions which, when executed by a processing device, cause the processing device to perform a method, the method comprising:
   accessing an image;
   receiving a selected area of the image;
   receiving a prompt, wherein the prompt is indicative of an editing instruction;
   generating a latent by transforming the image into visual noise;

predicting, based on the latent and the prompt, a noise image corresponding to the latent;
subtracting at least a portion of the noise image from the latent to generate an updated latent;
generating a noisy representation of the image;
generating a masked latent based on the noisy representation, the updated latent and selected area, wherein the masked latent comprises the updated latent in the areas corresponding to the selected area, and the noisy representation in the areas that do not correspond to the selected area.

20. A computing device comprising:
the non-transitory computer-readable storage medium of claim 19; and
a processor configured to execute the instructions stored in the non-transitory computer-readable storage medium.

\* \* \* \* \*